US011809849B1

(12) United States Patent
Zheng et al.

(10) Patent No.: US 11,809,849 B1
(45) Date of Patent: Nov. 7, 2023

(54) GLOBAL MODULO ALLOCATION IN NEURAL NETWORK COMPILATION

(71) Applicant: Amazon Technologies, Inc., Seattle, WA (US)

(72) Inventors: Hongbin Zheng, San Jose, CA (US); Randy Renfu Huang, Morgan Hill, CA (US); Robert Geva, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 141 days.

(21) Appl. No.: 17/326,175

(22) Filed: May 20, 2021

(51) Int. Cl.
*G06F 9/44* (2018.01)
*G06F 8/41* (2018.01)
*G06F 13/28* (2006.01)
*G06N 3/04* (2023.01)
*G06F 9/38* (2018.01)

(52) U.S. Cl.
CPC ............ *G06F 8/452* (2013.01); *G06F 9/3853* (2013.01); *G06F 13/28* (2013.01); *G06N 3/04* (2013.01)

(58) Field of Classification Search
CPC ........ G06F 8/452; G06F 9/3853; G06F 13/28; G06N 3/04
USPC .............. 717/149–150, 159–161; 706/12, 15
See application file for complete search history.

(56) References Cited

U.S. PATENT DOCUMENTS

| | | | | |
|---|---|---|---|---|
| 7,926,046 B2 * | 4/2011 | Halambi | ............... | G06F 8/4452 717/149 |
| 9,489,180 B1 * | 11/2016 | Baskaran | ................ | G06F 8/443 |
| 11,372,629 B1 * | 6/2022 | Meister | .................... | G06N 3/08 |
| 11,507,838 B2 * | 11/2022 | Bourges-Sevenier | ....................... | G06N 3/084 |

OTHER PUBLICATIONS

Douillet et al., "Multi-dimensional Kernel Generation for Loop Nest Software Pipelining", 2006, Springer-Verlag, pp. 311-322. (Year: 2006).*
Hamzeh et al., "REGIMap: Register-Aware Application Mapping on Coarse-Grained Reconfigurable Architectures (CGRAs)", 2013, ACM, pp. 1-10. (Year: 2013).*
Shrivastava et al., "dMAzeRunner: Accelerating Loop Nests on Dataflow Accelerators", 2019, Arizona State University, 20 pages. (Year: 2019).*
Dave et al., "dMazeRunner: Executing Perfectly Nested Loops on Dataflow Accelerators" 2019, ACM, pp. 1-24. (Year: 2019).*

* cited by examiner

*Primary Examiner* — Ted T. Vo
(74) *Attorney, Agent, or Firm* — Kilpatrick Townsend & Stockton LLP

(57) ABSTRACT

In one example, a method performed by a compiler comprises: receiving a dataflow graph of a neural network, the neural network comprising a neural network operator; receiving information of computation resources and memory resources of a neural network hardware accelerator intended to execute the neural network operator; determining, based on the dataflow graph, iterations of an operation on elements of a tensor included in the neural network operator; determining, based on the information, a mapping between the elements of the tensor to addresses in the portion of the local memory, and a number of the iterations of the operation to be included in a batch, wherein the number of the iterations in the batch are to be executed in parallel by the neural network hardware accelerator; and generating a schedule of execution of the batches of the iterations of the operations.

19 Claims, 27 Drawing Sheets

500

```
I1 = FullyConnectedLayer(I0, W)
I2 = BiasAdd(I1, B)
I3 = Relu(I2)
```

502 {
```
for (i = 0; i < N; ++i)                              ← 502a
    for (j = 0; j < M; ++j)                          ← 502b
        for (k = 0; k < K; ++k)                      ← 502c
            S0: I1[i, j] += I0[i, k] * W[j, k]
```

504 {
```
for (i = 0; i < N; ++i)                              ← 504a
    for (j = 0; j < M; ++j)                          ← 504b
        S1: I2[i, j] = I1[i, j] + B[j]
```

506 {
```
for (i = 0; i < N; ++i)                              ← 506a
    for (j = 0; j < M; ++j)                          ← 506b
        S2: I3[i, j] = relu(I2[i, j])
```

562

```
I1 = FullyConnectedLayer(I0, W)
I2 = BiasAdd(I1, B)
I3 = Relu(I2)
```

560 {
```
for (i = 0; i < N; ++i)                              ← 560a
    for (j = 0; j < M; ++j)                          ← 560b
        S0: for (k = 0; k < K; ++k)
                I1[i, j] += I0[i, k] * W[j, k]
        S1: I2[i, j] = I1[i, j] + B[j]
        S2: I3[i, j] = relu(I2[i, j])
```

622 { for (i = 0; i < N; ++i)
        X[i] = A[i] * 2

624 { for (j = 0; j < N; ++j)
        B[j] = X[j] * 2

630 →

632 → for (k = 0; k < M; ++k) {

634 { for (i = 0; i < N; ++i)
        X[k][i] = A[k][i] * 2

636 { for (j = 0; j < N; ++j)
        B[k][j] = X[k][j] * 2

```
for (i = 0; i < N; ++i)
    S3: X[i] = A[i] * 2
```

622 →

| | First write | Last read |
|---|---|---|
| X(0) | i=0 | i=0 |
| X(1) | i=1 | i=1 |

650 →

```
for (i = 0; i < N; ++i)
    S4: Y[i+1] = Y[i] + B[i]
```

652 →

| | First write | Last read |
|---|---|---|
| Y(1) | i=0 | i=1 |
| Y(2) | i=1 | i=2 |

662 →  for (i = 0; i < N + 2; ++i) { t[i] = activation if i < N;

664 →      for (r = 0; r < R; ++r)
                psum += matmult(t[i-2+r], weight[i][r]) if i >= 2;
                                                              ⎫
                                                              ⎬ 666
                                                              ⎭
        }
```

FIG. 6E

```
830
    662 → for (i = 0; i < N + 2; ++i) { t[i%M] = activation if i < N;

664 → for (r = 0; r < R; ++r)
                psum += matmult(t[i%M-2+r], weight[i%M][r]) if i >= 2;
                                                         ⎱
                                                         ⎰ 666
        }
```

GLOBAL MODULO ALLOCATION IN NEURAL NETWORK COMPILATION

BACKGROUND

Artificial neural networks are computing systems with an architecture based on biological neural networks. Artificial neural networks can be trained using training data to learn how to perform a certain task, such as identifying or classifying physical objects, activities, characters, etc., from images or videos. An artificial neural network, such as a deep neural network, may include multiple layers of processing nodes. Each processing node in a layer can perform computations on input data generated by processing nodes in the preceding layer to generate output data. For example, a processing node may perform a set of arithmetic operations such as multiplications and additions to generate an intermediate output, or perform post-processing operations on the intermediate output to generate a final output. An artificial neural network may include thousands of processing nodes and millions of parameters.

The architecture of a neural network may include an input layer, an output layer, and a number of intermediate layers, often referred to as hidden layers. Each layer executes a computation on the outputs of the previous layer, with the last layer (the output layer) providing a final result. With more layers, a neural network can, theoretically, perform more complex tasks, such as language translations and identifying (or classifying) the contents of an image. A neural network with more than three hidden layers is sometimes referred to as a deep neural network. Deep neural networks can have many hidden layers, such as, for example, between five and more than a thousand layers.

Neural networks can be implemented using a central processing unit (CPU) to perform the computations. CPUs, however, tend to be optimized for sequential rather than parallel computations, and thus can suffer from poor response times. Graphics processing units (GPUs) are optimized for parallel computations, but not necessarily optimized to provide the result from one computation unit directly to another computation unit. Often, the result must first be written to a memory and then read back. Although GPUs can have better response times than CPUs, it would still be desirable to improve the execution time of a neural network. Recently, special-purpose integrated circuit devices, such as a hardware neural network accelerator, have been developed to execute neural networks more efficiently than either CPUs or GPUs.

BRIEF DESCRIPTION OF THE DRAWINGS

Various embodiments in accordance with the present disclosure will be described with reference to the drawings.

FIG. 5A, FIG. 5B, FIG. 5C, and FIG. 5D illustrate examples of generating a loop representation of a neural network dataflow graph;

FIG. 6A, FIG. 6B, FIG. 6C, FIG. 6D, and FIG. 6E illustrate examples of loop representation of a neural network dataflow graph;

FIG. 8A, FIG. 8B, FIG. 8C, FIG. 8D, FIG. 8E, FIG. 8F, and FIG. 8G illustrate example techniques to determine the modulo operators in a loop representation of a neural network dataflow graph;

DETAILED DESCRIPTION

Figure 1:
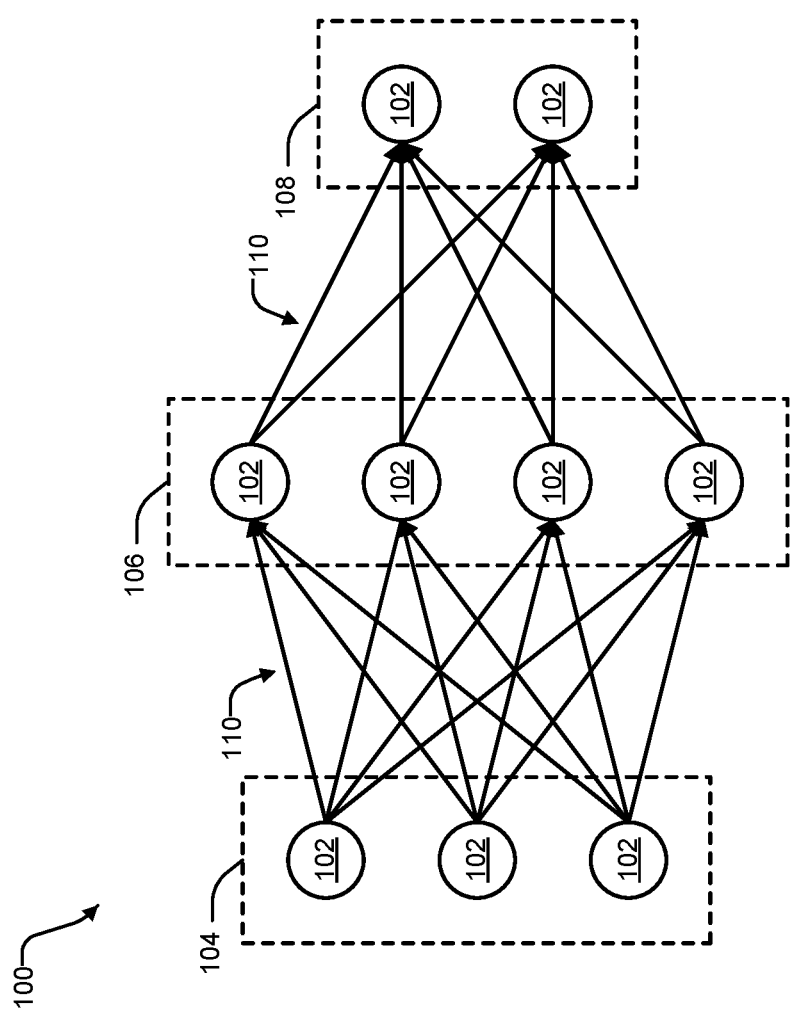
FIG. 1 illustrates an example of a computational flow model for a neural network.

Neural networks can include many interconnected operators of several different operator types. Operators of the same type may perform similar operations on the input data. For example, one type of operator may be an addition operator that adds two tensors together. Another type of operator may be a convolution operator that convolves an input tensor with a filter, which is characterized by a set of weights. An addition operator and a convolution operator can include a set of operations on input tensors to generate an output tensor. The set of operations can be repetitive in that the same type of operations are performed on different elements of the input tensors to generate corresponding elements of the output tensor. For example, an addition operator between two input tensors can include a set of repetitive addition operations, with each addition operation performed between two elements from the two input tensors to generate an element of the output tensor. The addition operation is then repeated over other elements of the two input tensors to generate other elements of the output tensor. As another example, a convolution operator between two input tensors (e.g., an image tensor and a weight tensor) can include a set of repetitive multiply-and-accumulation operations, with each operation involving multiplying two elements from the two input tensors to generate a product, and adding the product to an accumulator of products of other elements of the two input tensors. As yet another example, an activation function operation (e.g., ReLU) can be performed on each element in an input tensor to generate a corresponding element of an output tensor.

The repetitive operations in a neural network operator can be represented in the form of an affine loop. An affine loop is a loop with a canonical induction variable that starts at zero and increments by one for each iteration. The upper bound of the variable does not change during program execution. The induction variable incremented by the loop can be used to index a particular element of the tensor for an operation by the loop. In a case where the repetitive operations involve a multi-dimensional tensor that includes multiple tensors defined along different dimensions, the repetitive operations can be represented in a loop-nest, which may be manifested at certain intermediate representations generated by the compiler. In a simple example, a loop-nest includes an outer loop and an inner loop within the body of the outer loop. The outer loop and the inner loop may each iterate across a different range of induction variable values. Each range of values can correspond to a range of a dimension of the multi-dimensional tensor. For example, in a case of a two-dimensional tensor, the first iteration of the outer loop triggers the inner loop, which executes across its entire range of values to index the elements of a first tensor along a first column in multiple iterations. Upon completion of the inner loop, the outer loop moves to a second value within its range of values and again triggers the inner loop, which again executes across its entire range of values to index the elements of a second tensor along a second column in multiple iterations. A loop-nest can also be represented in a hierarchy (e.g., in the form of a hierarchical tree), in which the outer loop is a parent loop and the inner loop(s) nested within the outer loop are child loops. An inner loop may further include a nested inner loop as a child loop of the inner loop.

A compiler can compile input codes representing a neural network operator into executable instructions that can be in the form of binary codes. As part of the compiling process, the compiler can generate a loop-nest representation of the neural network operator. The generation of the loop-nest representation allows the compiler to determine the schedule of execution of each loop and, based on the schedule, generate the executable binary codes to control the order of execution of the loops. Specifically, a loop of the neural network operator may have no loop-carried dependency between iterations, such that the operation in one iteration does not depend on an output generated by the operation in another iteration. This allows the compiler to schedule the different iterations of operations to be executed in parallel, instead of executing each iteration sequentially. For example, in the aforementioned addition, multiply-and-accumulation, and activation function operators, each iteration of the addition, multiplication, and/or activation function operations may be performed on different elements of the input and output tensors and can be performed independently from other iterations. The compiler can control the different iterations of an operation to access different memory locations for different elements of the input/output tensor, to enable each iteration to be executed independently and in parallel with each other.

A hardware neural network accelerator typically includes computation resources, such as multiple computation engines, to support parallel execution of the different iterations of a neural network operator, as well as an on-chip memory to provide intermediate storage for the input and output of the neural network operator, all of which can speed up the execution of the neural network operator. But the level of parallelism supported by the hardware neural network accelerator can be limited by the amount of computation resources and memory space assigned (or intended) to the execution of the neural network operator. For example, the number of computation engines assigned to the execution of the neural network operator can limit a number of loop iterations that can be executed in parallel at a given time. Moreover, the memory space may limit a number of elements of a tensor stored in the memory at a given time. As each iteration indexes/accesses a different element of a tensor from a different memory address, the size of the memory space can also limit the number of iterations executing in parallel that can access the different elements at a given time.

The computation resources available to support parallel execution of the loop iterations, as well as the memory space available to support the parallel execution, typically vary. For example, different hardware neural network accelerators may have different numbers of computation engines and different memory sizes. Moreover, in a case where the neural network hardware accelerator is shared by multiple tenants, the computation resources and memory spaces assigned to each tenant may also vary. If a compiler does not take into account the computation resources and memory space assigned to the execution of the neural network operator when scheduling the parallel execution of the different iterations of a neural network operator, the compiler may generate instructions that may either underutilize or overutilize the computation and memory resources, which may lead to inefficient execution of the neural network operator or may affect other operations being performed by the neural network hardware accelerator.

Examples described herein provide methods, systems, and other techniques to improve the scheduling of repetitive operations of a neural network operator. The compiler can determine a number of iterations of the operations to be included in a batch, where operations within a batch can be executed in parallel and can access different memory addresses, while different batches are executed sequentially. Moreover, the compiler can determine an address mapping scheme in which the different batches of operations reuse the same set of memory addresses, to reduce the total memory footprint by the neural network operator. The compiler can determine the address mapping scheme and assign the iterations into batches based on the computation and memory resources assigned to the neural network operator. The assignment of the computation and memory resources to the neural network operator can be made by, for example, an administration/management software of the neural network hardware accelerator, and the information of about the computation and memory resources (e.g., a number of iterations of operations that can be executed in parallel, a size of a local memory space assigned to the particular neural network operator or to the entire neural network, etc.) can be part of configuration parameters of the compiler to configure the compilation operation. After determining the address mapping scheme and the batches, the compiler can determine a schedule of execution of the batches, as well as the addresses of the memory accessed by the iterations of operations within each batch, and generate binary codes based on the schedule of execution of the batches and the addresses of the memory accessed by the batches.

Specifically, the compiler can receive input codes involving neural network computations and compile the input codes to generate a dataset representing a dataflow graph of a neural network. The dataflow graph may include a plurality of neural network operators, such as an addition operator, a convolution operator, an activation function (e.g., ReLU) operator, etc. Each neural network operator can be represented as a node in the dataflow graph. The compiler can generate a linear graph from the dataflow graph by performing, for example, a topological sort to assign each node (and the associated neural network operator) to the linear graph. The compiler can then generate a program representing the linear graph based on translating each neural network operator represented in the linear graph into a loop including instructions to access a tensor. In a case where the tensor is multi-dimensional and includes multiple tensors defined along different dimensions, the compiler can translate the neural network operator that accesses the multi-dimensional tensor into a loop-nest, with a parent outer-loop and one or more child inner-loops. The parent outer-loop and the child inner-loops can be associated with different induction variables associated with different dimensions. The loops can update the induction variables to select different tensors in different iterations. In some examples, the translation can be based on accessing loop-nest templates in a compute definition library that associates different loop-nest templates with different neural network operators. In some examples, additional processing, such as a loop fusion operation to fuse two or more loop-nests together while preserving the original behaviors of the loop-nests, can also be performed.

After generating the program including the loops and/or loop-nests, the compiler can identify a tensor indexed by one or more loops that does not create loop-carried dependency in the tensor. The tensor may include a plurality of elements, with each element associated with an index, and a loop's induction variable can set the index of the element to be accessed in an iteration of the loop. In a case where the tensor is multi-dimensional and has multiple tensors, each element can be associated with multiple indices in multiple dimensions set by multiple loops, where each index can be set by the induction variable of a different loop. A lack of loop-carried data dependency allows each loop iteration that accesses a tensor (of a multi-dimensional tensor) or a tensor element to be executed independently.

The compiler can carry out a two-step test to determine whether there is loop-carried dependency in the tensor. As a first step, the compiler can determine whether the indices along one dimension are set by two different loops, and whether the tensor is written in one loop and read in another loop. If both are true, the compiler may determine there is loop-carried dependency between the two different loops. On the other hand, for tensors/elements of which the indices of one dimension are set by a single loop, the compiler can carry out a second step of the two-step test to determine whether there is loop-carried dependency.

As a second step of the test, the compiler can determine whether there is a loop-carried dependency between elements of the tensor. A loop-carried dependency may exist when, for example, a first element of the tensor accessed by a first iteration of the loop has data dependency on a second element of the tensor accessed by a second iteration of the loop. In some examples, the compiler can determine a live interval of each element of the tensor, which is defined by logical timestamps of when the tensor element is first written and when it is last read, and determine the loop-carried dependency (if any) between the elements of the tensor based on whether the live intervals of the elements overlap. The logical timestamps can be defined by the induction variables of the loop for the first write and the last read of a tensor element. In some examples, a loop-nest may index multiple tensors, and the compiler can determine the live interval of each element of the tensors to determine loop-carried dependency (if any) for each tensor indexed by the loop-nest.

After identifying tensor(s) that have no loop-carried dependency, the compiler can identify the loop that indexes the tensor using the loop's induction variable, and determine an initial modulo operator for that loop as part of a global modulo allocation operation. The modulo operator can operate on the original indices (e.g., directly from the induction variables) of elements of the tensor in the program to generate remainder values. The remainder values can represent memory addresses. Through the modulo operation, elements of the tensor having different original indices can be mapped to a range of remainder values each representing a different address in the memory. The modulo operator can indicate how many elements of the tensor are mapped to different addresses in the memory. For example, for a modulo operator of m, m elements of the tensors are mapped to m different addresses, and m iterations of the loop can be included in a batch to be executed in parallel to access the m different addresses. Different groups of m elements are accessed in different batches, and the different groups are all mapped to the same set of m addresses. In a case of a multi-dimensional tensor including multiple tensors defined along multiple dimensions and associated with a loop-nest, and the compiler can determine an initial modulo operator for each loop that indexes the different tensors along different dimensions.

The compiler may determine not to assign modulo operator on indices of a dimension of a tensor which has a loop-carried dependency. Specifically, if the tensor fails the first step of the two-step test where the tensor is written in one loop and read in another loop, the compiler may determine that the first loop writes all tensor elements (or tensors) of the tensor of that dimension separately in the memory, instead of mapping multiple tensor elements/tensors to a single set of addresses, so that the second loop can access all of the tensor elements (or tensors) of the tensor. Moreover, in a case where there is loop-carried dependency within a loop between tensor elements of the same dimension, the compiler may also determine not to assign modulo operator on indices of that dimension to avoid violating the data dependency between iterations of the loop.

The initial modulo operators for each loop can be determined based on a maximum degree of parallel execution of the neural network operator supported by the neural network hardware accelerator, as well as the size of memory space assigned to the neural network operator. Specifically, the number of iterations made available for parallel execution may be equal to the product of initial modulo operators of each loop in a loop-nest. For example, assuming that a loop-nest includes a parent outer loop that indexes elements of a first tensor, and a child inner loop that indexes elements of a second tensor, then the first tensor is assigned a first initial modulo operator of m and the second tensor is assigned a second initial modulo operator of n, and the product m×n can determine the number of iterations made available for parallel execution. That product is typically smaller than or equal to a number of iterations the neural network hardware accelerator can execute in parallel (e.g., 8, 16, etc.) for the neural network operator, which in turn is based on the computation resources assigned to the neural network operator. In addition, as described above, the initial modulo operator can define how many different elements/tensors are to be mapped to different addresses. With a larger modulo operator on the original indices of the elements/tensors, a larger number of the elements/tensors can be mapped to a larger number of different addresses, and thereby a larger memory space is used to store the elements/tensors, and vice versa. The compiler can therefore determine the initial modulo operator based on the size of the memory space assigned to the elements/tensors. In some examples, the compiler can determine the initial modulo operators of the tensors accessed by a loop-nest based on a topological order traversal, in which the compiler assigns the initial modulo operators of the tensors indexed by the parent loop first based on the assigned memory spaces for the tensors/elements indexed by the parent loop. The compiler can then assign the initial modulo operators of the tensors indexed by the child loop, under the constraint that the product of the initial modulo operators across the loops remains equal to or below the maximum degree of parallel execution supported by the neural network hardware accelerator. In some examples, the compiler can also assign the initial modulo operators for the child loops first, followed by the parent loops.

The assignment order of initial modulo operators (parent loop followed by child loops, or vice versa) can be based on the architecture of the system that execute the neural network operators. For example, for a system that has multiple hardware processors, the compiler may preferentially set the initial modulo operators for the parent loop first, followed by the child loops, to manage parallel execution of the parent loops across the multiple hardware processors. On the other hand, for a system that has a single hardware processor with multiple execution engines, the compiler may preferentially set the initial modulo operators for the child loops first, followed by the parent loop, to manage parallel execution of the child loops across the execution engines for each iteration of the parent loop.

After determining the initial modulo operators, as part of the global modulo allocation operation, the compiler can reduce some or all of the initial modulo operators based on whether the total memory footprint by the tensors exceeds the available memory space. Specifically, the compiler can determine the live interval of each tensor for which an initial modulo operator is assigned, as well as the size of memory used by the tensor during the live interval. Tensors having overlapping live intervals can indicate that the memory needs to store the tensors simultaneously, whereas tensors that do not have overlapping live intervals need not be stored simultaneously. The compiler can determine the total memory footprint by the tensors based on identifying tensors having overlapping live intervals, as well as their memory footprints. If the total memory footprint of the tensors with the initial modulo operators is below the available memory space, the compiler can stop the global modulo allocation operation.

On the other hand, if the total memory footprint is above the available memory space, the compiler can determine an overflowing tensor that cannot fit into the available memory space. To reduce the total memory footprint, the compiler identifies the loop that includes a first write instruction and a last read instruction of that tensor, and reduces the initial modulo operator of the closest parent loop of the loop in the hierarchy (e.g., by reducing it by half) if the initial modulo operator of the closest parent loop is bigger than one. Such arrangements can be more effective in reducing the total memory footprint, since reducing the initial modulo operator of the parent loop can reduce the memory footprint both by the parent tensor indexed by the parent loop and by the child tensor (the overflowing tensor) indexed by the second parent loop. The reduction of the memory footprint by the first tensor can be due to mapping the elements of the first tensor to fewer addresses. Moreover, the reduction of the memory footprint by the second tensor can be due to reducing the number of parallel iterations of the child loop (given by the product of the modulo operators of both loops), which can also reduce the number of addresses mapped to the elements of the second tensor.

After reducing the initial modulo operator of the closest parent loop of the loop, the compiler can update the memory footprint estimate based on the new modulo operator of the closest parent loop, and determine whether the child tensor can fit into the available memory space. If the child tensor can fit, the compiler can stop the global modulo allocation operation. If the child tensor still cannot fit, the compiler can further reduce the modulo operator of the closest parent loop if the modulo operator is still above one. If the modulo operator of the closest parent loop equals one (e.g., after multiple rounds of reduction), such that there is no parallel execution of iterations of the closest parent loop, the compiler can proceed to reduce the modulo operator of the child loop (e.g., by half) that indexes the child tensor. The compiler can repeat the reduction of the modulo operator of the child loop until the total memory footprint is below the available memory space.

In some examples, the neural network operator can also include one or more tensors accessed by direct memory access (DMA) instructions ("DMA tensors") to transfer data between an external memory and the local memory of the neural network hardware accelerator. The DMA instructions can also be included in the same loop as other instructions of a neural network operator (e.g., additions, multiplications, activation function processing, etc.), to provide memory data transfer to support those instructions. The DMA tensors can be stored in the local memory of the neural network hardware accelerator as the other tensors ("local tensors") accessed by other neural network operations.

As part of the global modulo allocation operation, the compiler can also determine the modulo operator that maps the elements of the DMA tensor to the addresses of the local memory. The DMA instructions may be in the same loop as other neural network operation instructions, and the DMA tensor can be indexed by the induction variable of that loop. The modulo operator can determine a local memory footprint by the DMA tensor as well as a number of DMA instructions to be executed in parallel in accessing the DMA tensor. The compiler may estimate the local memory footprint of the DMA tensor and the local tensor based on determining the live intervals of the DMA tensor and local tensor, and summing the footprints of tensors having overlapping live intervals, as described above.

If the total memory footprint exceeds the available memory space, the compiler may preferentially reduce the modulo operator for the local tensors, before reducing the modulo operator of the DMA tensors. This can lead to more DMA instructions to be executed in parallel than the other neural network operations, even though the DMA instruction and the neural network operation are in the same loop, and the DMA tensor and the local tensor being indexed by the same induction variable. Such arrangements can improve the performance of the neural network hardware accelerator, especially in a case where the DMA operations present a substantial bottleneck. Moreover, while the DMA instructions start execution in parallel, they typically do not complete at the same time due to the sequential access of the external memory. As a result, other neural network operations that depend on the DMA operations need not have the same parallelism and can be performed sequentially after the DMA operations complete. As a result, parallelism of the neural network operations can be reduced with minimum effect on the execution speed of these operations, while at the same time reducing the memory footprint.

After the global modulo allocation operation completes and the modulo operators for the tensors of the program are determined, the compiler can determine a schedule of execution of the different iterations of the loops in the program and the mapping of the tensors to the memory addresses based on the modulo operators. The compiler can perform the scheduling based on estimating the total completion time of the DMA operations, which can include the memory access delay as well as memory data transfer delay over the interconnect, as well as data dependency between the tensors. The compiler can then generate executable instructions that reflect the schedule of execution of the different iterations of the loops in the program.

With the disclosed examples, a compiler can schedule the repetitive operations of a neural network operator based on the available computation and memory resources to maximize the parallel execution of the operations of the neural network operator allowed by the available computation resources, while ensuring that there are sufficient memory resources to support the parallel execution. Such arrangements can reduce underutilization or overuse of the available computation and memory resources and improve the performance of the neural network hardware accelerator that executes the neural network operator.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example of a computational flow model 100 for a neural network. Neural networks take inspiration from the mechanics of the operation of the human brain. According to various models of the brain, the main computational element of the brain is the neuron. Neurons are connected together with a number of elements, with elements entering a neuron being referred to as dendrites and an element leaving a neuron being referred to as an axon. A neuron accepts signals via dendrites, performs a computation on the signals, and outputs a signal on an axon. The input and output signals are referred to as activations. The axon of one neuron can branch out and be connected to the dendrites of multiple neurons. The connection between a branch of an axon and a dendrite is called a synapse.

A synapse can scale the signal crossing the synapse. The scaling factor is referred to as a weight, and is thought of as the way a brain is able to learn: different weights result from different responses to input. Learning can change the weights, but the organization of the neurons and synapses need not change to obtain the learning. The static structure of the brain can thus be used as a model for a program, and the weights can reflect tasks that the program has learned to perform.

Neural networks operate on the notion that a neuron's computation involves a weighted sum of input values. These weighted sums correspond to the value scaling performed by the synapses and the combining of those values in the neuron. A functional operation is performed in the neuron on the combined inputs. In the brain model, the operation appears to be a non-linear function that causes the neuron to generate an output only when the inputs cross some threshold. Thus, by analogy, the nodes of a neural network can apply a non-linear function to the weighted sum of the values input into the nodes.

In the illustrated example, the model 100 includes an input layer 104, a middle layer that is often referred to as a hidden layer 106, and an output layer 108. Each layer includes some number of nodes 102. In this example, the nodes 102 of the input layer 104 are connected to each node 102 of the hidden layer 106. The connections, which would be referred to as synapses in the brain model, are referred to as weights 110. Also in this example, each node 102 of the hidden layer 106 has a connection or weight 110 with each node 102 of the output layer. The input layer 104 can receive inputs and can propagate the inputs to the hidden layer 106. A neural network implementation can include multiple hidden layers. Weighted sums computed by the hidden layer 106 (or multiple hidden layers) are propagated to the output layer 108, which can present final outputs to a user. The outputs of the nodes 102 can be referred to as activations, in keeping with the brain model.

An example of a computation that can occur at each layer in the example model 100 is as follows:

$$y_j = f(\Sigma_{i=1}^{3} W_{ij} \times x_i, b) \quad \text{(Equation 1)}$$

In the above equation, $W_{ij}$ is a weight, $x_i$ is an input activation, $y_j$ is an output activation, $f(\ )$ is a non-linear function, and b is a bias term. Various non-linear functions can be used to achieve different purposes.

The model 100 can be referred to as a directed, weighted graph. In a directed graph, each connection to or from a node indicates a direction (e.g., into the node or away from the node). In a weighted graph, each connection can have a weight. Tools for developing neural networks can visualize the neural network as a directed, weighted graph, for ease of understanding and debuggability. In some cases, these tools can also be used to train the neural network and output trained weight values. Executing the neural network is then a matter of using the weights to conduct computations on input data.

Neural networks with many layers can be capable of learning high-level features having more complexity and abstraction than shallower networks. As an example, a neural network can be taught to recognize images. In this example, pixels of an image can be fed into the input layer of the neural network, and the outputs of the first layer can indicate the presence of low-level features in the image, such as lines and edges. At subsequent layers, these features can be combined to measure the likely presence of higher level features: the lines can be combined into shapes, which can be further combined into sets of shapes. Given all this information, the neural network can output a probability that the high-level features represent a particular object or scene. For example, the neural network can output whether an image contains a cat or does not contain a cat.

The learning phase of a neural network is referred to as training the neural network. During training, the neural network is taught to perform a task. In learning the task, values for the weights (and possibly also the bias) are determined. The underlying program for the neural network (e.g., the organization of nodes into layers, the connections between the nodes of each layer, and the computation executed by each node), does not need to change during training. Once trained, the neural network can perform the task by computing a result using the weight values that were determined during training. For example, the neural network can output the probability that an image contains a particular object, can output the probability that an audio sequence contains a particular word, can generate a bounding box around an object in an image, or can propose an action that should be taken, etc. Running the program for the neural network is referred to as inference.

There are multiple ways in which weights can be trained. One method is called supervised learning. In supervised learning, all training samples are labeled, so that inputting each training sample into a neural network produces a known result. Another method is called unsupervised learning, where the training samples are not labeled and training aims to find a structure in the data or clusters in the data. Semi-supervised learning falls between supervised and unsupervised learning. In semi-supervised learning, a subset of training data is labeled. The unlabeled data can be used to define cluster boundaries and the labeled data can be used to label the clusters.

Figure 2:
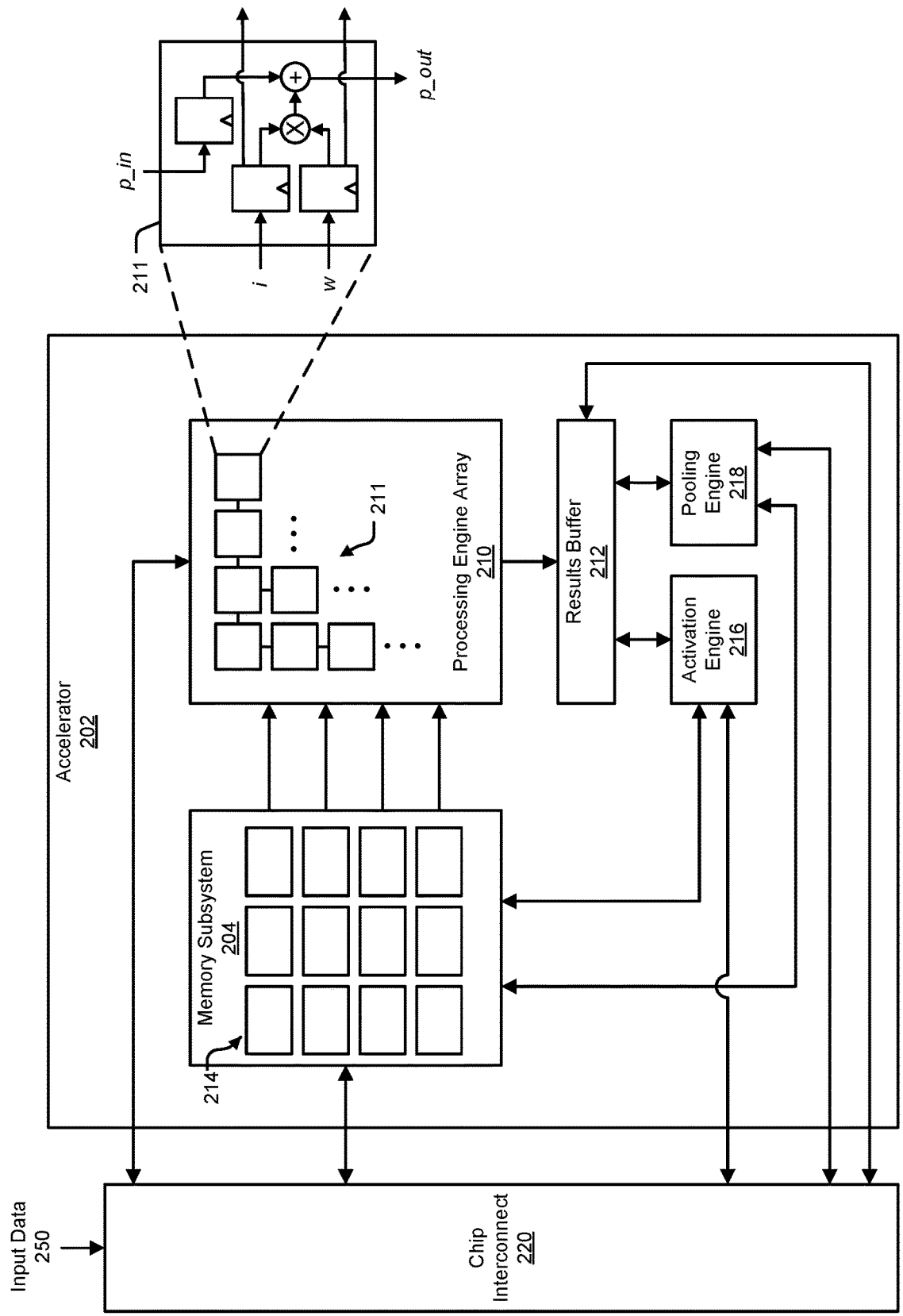
FIG. 2 illustrates an example of an integrated circuit that can be programmed to execute the computational flow model of FIG. 1.

A neural network, such as the neural network represented in FIG. 1, can be in a hardware neural network accelerator to more efficiently execute computations of the neural network. FIG. 2 is a block diagram illustrating an example of an integrated circuit device. The example of FIG. 2 illustrates an accelerator 202. In various examples, the accelerator 202, for a set of input data (e.g., input data 250), can perform computations using a processing engine array 210, an activation engine 216, and/or a pooling engine 218. In some examples, the example accelerator 202 may be an integrated circuit component of a processor, such as a neural network processor. The processor may have other integrated circuit components, including additional accelerator engines. Accelerator 202 may execute a set of instructions that reflects, for example, computational flow model 100 of FIG. 1, to perform the computations.

In various implementations, the memory subsystem 204 can include multiple memory banks 214. In these implementations, each memory bank 214 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 214. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 204 can permit simultaneous access to the read or write channels of multiple memory banks. As another example, the memory subsystem 204 can include arbitration logic such that arbitration between, for example, the outputs of multiple memory banks 214 can result in more than one memory bank's output being used. In these and other examples, though globally managed by the memory subsystem 204, each memory bank can be operated independently of any other.

Having the memory banks 214 be independently accessible can increase the efficiency of the accelerator 202. For example, values can be simultaneously read and provided to each row of the processing engine array 210, so that the entire processing engine array 210 can be in use in one clock cycle. As another example, the memory banks 214 can be read at the same time that results computed by the processing engine array 210 are written to the memory subsystem 204. In contrast, a single memory may be able to service only one read or write at a time. With a single memory, multiple clock cycles can be required, for example, to read input data for each row of the processing engine array 210 before the processing engine array 210 can be started.

In various implementations, the memory subsystem 204 can be configured to simultaneously service multiple clients, including the processing engine array 210, the activation engine 216, the pooling engine 218, and any external clients that access the memory subsystem 204 over a communication fabric 220. In some implementations, being able to service multiple clients can mean that the memory subsystem 204 has at least as many memory banks as there are clients. In some cases, each row of the processing engine array 210 can count as a separate client. In some cases, each column of the processing engine array 210 can output a result, such that each column can count as a separate write client. In some cases, output from the processing engine array 210 can be written into the memory banks 214 that can then subsequently provide input data for the processing engine array 210. As another example, the activation engine 216 and the pooling engine 218 can include multiple execution channels, each of which can be separate memory clients. The memory banks 214 can be implemented, for example, using static random access memory (SRAM).

In various implementations, the memory subsystem 204 can include control logic. The control logic can, for example, keep track of the address spaces of each of the memory banks 214, identify memory banks 214 to read from or write to, and/or move data between the memory banks 214. In some implementations, memory banks 214 can be hardwired to particular clients. For example, a set of memory banks 214 can be hardwired to provide values to the rows of the processing engine array 210, with one memory bank servicing each row. As another example, a set of memory banks can be hard wired to receive values from columns of the processing engine array 210, with one memory bank receiving data for each column.

The processing engine array 210 is the computation matrix of the example accelerator 202. The processing engine array 210 can, for example, execute parallel integration, convolution, correlation, and/or matrix multiplication, among other things. The processing engine array 210 includes multiple processing engines 211, arranged in rows and columns, such that results output by one processing engine 211 can be input directly into another processing engine 211. Processing engines 211 that are not on the outside edges of the processing engine array 210 thus can receive data to operate on from other processing engines 211, rather than from the memory subsystem 204.

In various examples, the processing engine array 210 uses systolic execution, in which data arrives at each processing engine 211 from different directions at regular intervals. In some examples, input data can flow into the processing engine array 210 from the left and weight values can be loaded at the top. In some examples weights and input data can flow from the left and partial sums can flow from top to bottom. In these and other examples, a multiply-and-accumulate operation moves through the processing engine array 210 as a diagonal wave front, with data moving to the right and down across the array. Control signals can be input at the left at the same time as weights, and can flow across and down along with the computation.

In various implementations, the number of columns in the processing engine array 210 determines the computational capacity of the processing engine array 210, and the number of rows determines the required memory bandwidth for achieving maximum utilization of the processing engine array 210. The processing engine array 210 can have, for example, 64 columns and 428 rows, or some other number of columns and rows.

An example of a processing engine 211 is illustrated in FIG. 2 in an inset diagram. As illustrated by this example, a processing engine 211 can include a multiplier-accumulator circuit. Inputs from the left can include, for example, input data i and a weight value w, where the input data is a value taken from either a set of input data or a set of intermediate results, and the weight value is from a set of weight values that connects one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 211.

In the illustrated example, an input from above can include a partial sum, p_in, provided either from another processing engine 211 or from a previous round of computation by the processing engine array 210. When starting a computation for a new set of input data, the top row of the processing engine array 210 can receive a fixed value for p_in, such as zero. As illustrated by this example, i and w are multiplied together and the result is summed with p_in to produce a new partial sum, p_out, which can be input into another processing engine 211. Various other implementations of the processing engine 211 are possible.

Outputs from the last row in the processing engine array 210 can be temporarily stored in the results buffer 212. The results can be intermediate results, which can be written to the memory banks 214 to be provided to the processing engine array 210 for additional computation. Alternatively, the results can be final results, which, once written to the memory banks 214, can be read from the memory subsystem 204 over the communication fabric 220, to be output by the system.

In some implementations, the accelerator 202 includes an activation engine 216. In these implementations, the activation engine 216 can combine the results from the processing engine array 210 into one or more output activations. For example, for a convolutional neural network, convolutions from multiple channels can be summed to produce an output activation for a single channel. In other examples, accumulating results from one or more columns in the processing engine array 210 may be needed to produce an output activation for a single node in the neural network. In some examples, activation engine 216 can be bypassed.

In various examples, the activation engine 216 can include multiple separate execution channels. In these examples, the execution channels can correspond to the columns of the processing engine array 210, and can perform an operation on the outputs of a column, the result of which can be stored in the memory subsystem 204. In these examples, the activation engine 216 may be able to perform between 1 and n parallel computations, where n is equal to the number of columns in the processing engine array 210. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 202 can include a pooling engine 218. Pooling is the combining of outputs of the columns of the processing engine array 210. Combining can include, for example, computing a maximum value, a minimum value, an average value, a median value, a summation, a multiplication, or another logical or mathematical combination. In various examples, the pooling engine 218 can include multiple execution channels that can operate on values from corresponding columns of the processing engine array 210. In these examples, the pooling engine 218 may be able to perform between 1 and n parallel computations, where n is equal to the number of columns in the processing engine array 210. In various examples, execution channels of the pooling engine 218 can operate in parallel and/or simultaneously. In some examples, the pooling engine 218 can be bypassed.

Herein, the activation engine 216 and the pooling engine 218 may be referred to collectively as execution engines. The processing engine array 210 is another example of an execution engine. Another example of an execution engine is a Direct Memory Access (DMA) engine, which may be located outside the accelerator 202.

Input data 250 can arrive over the communication fabric 220. The communication fabric 220 can connect the accelerator 202 to other components of a processor, such as a DMA engine that can obtain input data 250 from an Input/Output (I/O) device, a storage drive, or a network interface. The input data 250 can be, for example one-dimensional data, such as a character string or numerical sequence, or two-dimensional data, such as an array of pixel values for an image or frequency and amplitude values over time for an audio signal. In some examples, the input data 250 can be three-dimensional, as may be the case with, for example, the situational information used by a self-driving car or virtual reality data. In some implementations, the memory subsystem 204 can include a separate buffer for the input data 250. In some implementations, the input data 250 can be stored in the memory banks 214 when the accelerator 202 receives the input data 250.

In some examples, the accelerator 202 can implement a neural network processing engine. In these examples, the accelerator 202, for a set of input data 250, can execute a neural network to perform a task for which the neural network was trained. Executing a neural network on a set of input data can be referred to as inference or performing inference.

The weights for the neural network can be stored in the memory subsystem 204, along with input data 250 on which the neural network will operate. The neural network can also include instructions, which can program the processing engine array 210 to perform various computations on the weights and the input data. The instructions can also be stored in the memory subsystem 204, in the memory banks 214 or in a separate instruction buffer. The processing engine array 210 can output intermediate results, which represent the outputs of individual layers of the neural network. In some cases, the activation engine 216 and/or pooling engine 218 may be enabled for computations called for by certain layers of the neural network. The accelerator 202 can store the intermediate results in the memory subsystem 204 for inputting into the processing engine array 210 to compute results for the next layer of the neural network. The processing engine array 210 can further output final results from a last layer of the neural network. The final results can be stored in the memory subsystem 204 and then be copied out to host processor memory or to another location.

Figure 3:
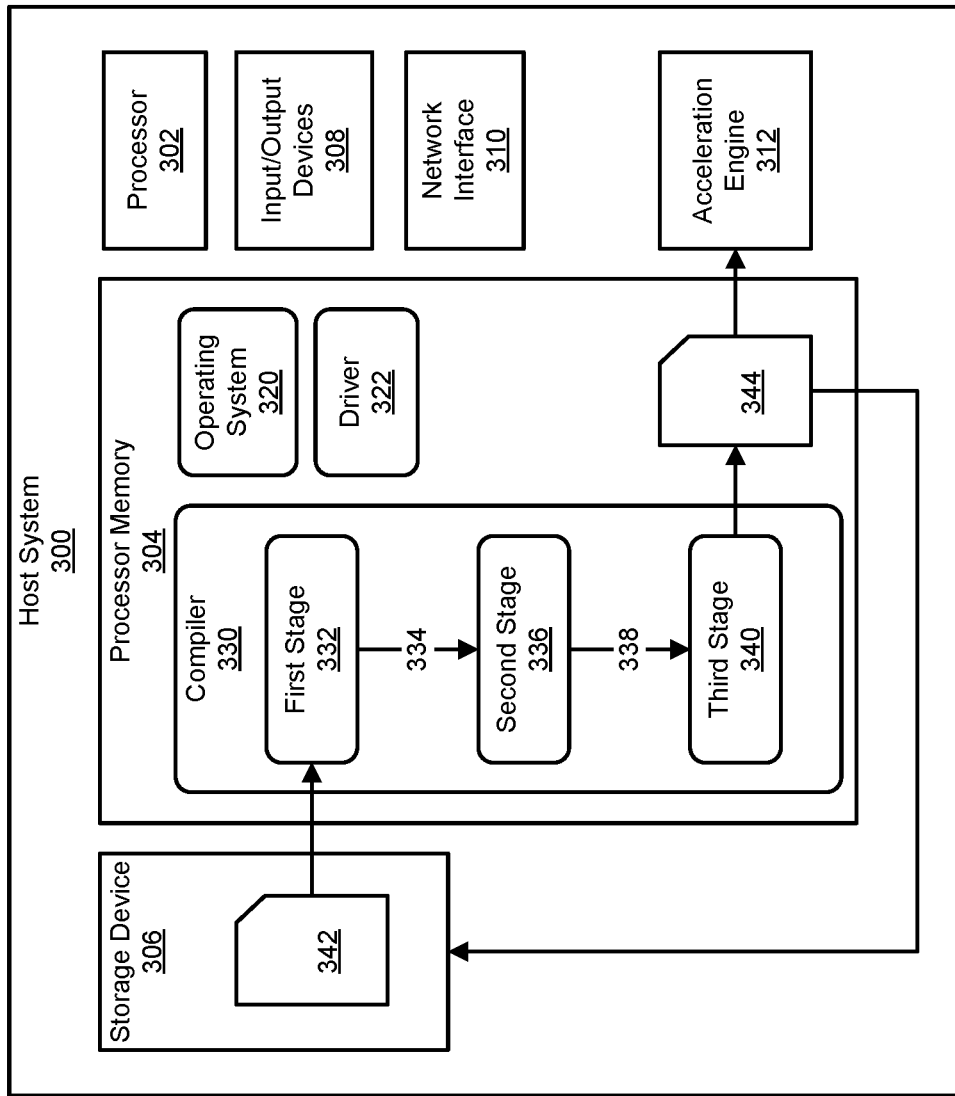
FIG. 3 illustrates an example of a host system that can generate executable instructions to be executed by the integrated circuit of FIG. 2.

As described above, accelerator 202 may execute a set of instructions that reflects, for example, computational flow model 100 of FIG. 1, to perform the computations for a neural network. The set of instructions can be generated by a compiler. FIG. 3 includes a block diagram illustrating an example of a host system 300 on which the compiler can run. The illustrated host system 300 is an example of a computing device, and includes a processor 302, a processor memory 304, at least one storage device 306, various Input/Output (I/O) devices 308, and at least one network interface 310. In the example of FIG. 3, the host system 300 also includes an acceleration engine 312, which is an integrated circuit device that can accelerate certain operations or computations performed by the host system 300. In various examples, the host system 300 can be implemented as a server in a data center, a desktop computer, a laptop computer, a tablet computer, or a smartphone, among other examples. In some examples, operations or components discussed below as performed or included in the host system 300 can be performed or included in other computer devices. For example, the compiler 330 can execute on the host system 300 while the acceleration engine 312 is located at a different host system.

The processor 302 is an integrated circuit device that can execute program code, in the form of instructions. The program code can be used for various software applications or tools, such as an operating system 320 or the illustrated compiler 330. While the processor 302 is executing a program, the instructions for the program can be stored in the processor memory 304. The instructions can also be stored elsewhere, such as on the storage device 306, and can be loaded into the processor memory 304 when needed by the processor 302. The processor 302 can also use the processor memory 304 for temporary storage of other data on which the processor 302 is operating. In various examples, the processor memory 304 is a volatile memory type, such as a type of Random Access Memory, though non-volatile memory types can, alternatively or additionally, be used for the processor memory 304.

The storage device 306 is an example of a device that can include non-volatile memory. For example, the storage device 306 can be a magnetic disk drive, a solid state drive, or an optical drive, among other examples. The storage device 306 can further be non-transitory, such that program code and other data stored on the storage device 306 remains present when the storage device 306 is not powered on.

The storage device 306 is one example of a peripheral device, which are components that can be coupled to the host system 300 to add functionality to the host system 300. Other examples of peripheral devices include the Input/Output devices 308 and the network interface 310. The Input/Output devices 308 can include user input and output devices, such as keyboards, mice, touch screens, microphones, display screens, speakers, printers, and scanners, among other examples. The network interface 310, which can be implemented using a network interface card, can provide access to one or more networks. The network interface 310 can include, for example, a physical port for connecting a network cable and/or wireless antennas for communicating with Wi-Fi and/or cellular networks. The network interface 310 can also be described as an I/O device.

The acceleration engine 312 is also another type of peripheral device or I/O device. The acceleration engine 312 is a device that is purpose built to perform certain operations that can be performed by the processor 302, but can be performed faster by the acceleration engine 312. For example, the acceleration engine 312 can be a neural network accelerator, and, as such, may be able to perform the large scale, parallel computations of a neural network more efficiently than when the computations are performed by the processor 302. As another example, the acceleration engine 312 can be a GPU, and may be optimized to perform the computations needed for graphics rendering. Other examples of devices that can be implemented by the acceleration engine 312 include cryptographic accelerators, compression and decompression accelerators, 3-D accelerators, regular expression accelerators, security accelerators, and others.

In various examples, the acceleration engine 312 can execute program code to perform certain operations. For example, when the acceleration engine 312 is a neural network accelerator, the acceleration engine 312 can be programmed to execute a particular neural network, such as one that performs image recognition or one that performs machine translation. As a further example, to support the execution of a neural network, the acceleration engine 312 can be programed to perform operations such as copying data for the neural network from processor memory 304 (for example) into the acceleration engine 312, copying input data for the neural network from processor memory 304 into the acceleration engine 312, and/or copying results from the acceleration engine 312 into the processor memory 304, among other examples.

To generate program code for the acceleration engine 312, in various examples, the host system 300 can execute the compiler 330. Compilers, in general, are software programs that translate program code written in a human-readable language into a format (e.g., machine instructions) that can be read and processed by an integrated circuit device. In the example of FIG. 3, the acceleration engine 312 is a neural network accelerator and the compiler 330 is for compiling a neural network description into instructions to be executed on the acceleration engine 312. When the acceleration engine 312 implements a different type of accelerator, another compiler can be used.

The compiler 330 can be activated, for example, when the operating system 320 receives keyboard, mouse, touchscreen, voice commands, or other inputs from the Input/Output devices 308. The inputs can further include parameters for the compiler 330, such as the input code 342 to compile and configuration options for the compilation process. Once the compiler 330 is activated, the processor 302 can load the instructions for the compiler 330 into the processor memory 304, and can execute the instructions.

In the example of FIG. 3, the compiler 330 includes a first stage 332, a second stage 336, and a third stage 340, which each perform different operations to produce compiled code 344. In other examples, the compiler 330 can combine the operations of the first stage 332, second stage 336, and/or third stage 340 into fewer stages, or can divide the operations of one of the stages into multiple stages.

The first stage 332 can receive and process input code 342. The input code 342 can describe a program in a high-level programming language, such as Java, C++, or Tensorflow, among many other examples. The input code 342 can describe, for example, steps to perform image recognition, speech recognition, machine translation, or other operations. The input code 342 can be obtained, for example, from the storage device 306. Alternatively, though not illustrated here, the input code 342 may be located in the processor memory 304 or can be obtained from a network location, using the network interface 310. Processing of the input code 342 can include sorting the operations described in the input code 342 into layers, where the outputs of one layer provide the inputs to a next layer. Processing can also include identifying steps to be performed by the processor 302, rather than by the acceleration engine 312. For example, the processor 302, through the execution of a driver 322, may need to perform steps such as configuring Direct Memory Access (DMA) descriptors for moving data into or out of the acceleration engine 312, among other examples.

The output 334 of the first stage 332 can be organized, for example, in the layers, nodes, and connections between nodes of a neural network. The second stage 336 can perform intermediate processing on this output 334. For example, the operations performed in any one layer, or at any one node in a layer, may be too many for the acceleration engine 312 to perform at the same time. The acceleration engine 312 may, for example, have a limited amount of local storage space for the data needed for a computation, or the computations may be more than the acceleration engine 312 can perform at one time. In this example, the first stage 332 can break the operations of the layer or node down into smaller operations, which can fit into the acceleration engine's local memory and/or can fit into the computing capacity of the acceleration engine 312. Processing of the output 334 of the first stage 332 can include other steps, such as scheduling, or determining the order in which the acceleration engine 312 and/or processor 302 will perform operations, among other examples.

In various examples, the output 338 of the second stage 336 includes the various steps to be performed by components of the acceleration engine 312, in the order that the steps are to be performed. The output 338 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 340 can operate on the output 338 of the second stage 336, and perform various steps before producing the instructions that are to be executed by the acceleration engine 312. These steps can include, for example, removing redundant dependencies, resolving or handling dependencies between nodes by inserting synchronization instructions into the code, identifying possible optimizations in memory footprint or memory bandwidth usage, and other operations.

The output of the third stage 340 is compiled code 344, which may include machine instructions in binary format. In some examples, the compiled code 344 can be stored in the processor memory 304. Alternatively or additionally, the compiled code 344 can be copied to the storage device 306 or to a network location. As noted above, the acceleration engine 312 may be located at a different host system, in which case the compiled code 344 can be sent over the network interface 310 to the other host system.

In the example of FIG. 3, the host system 300 can execute a driver 322, which can also be referred to as a device driver or runtime driver, that manages the acceleration engine 312. The driver 322 can provide an interface between applications executing on the host system 300 (or on another host system) and the acceleration engine 312. For example, the driver 322 can provide an Application Program Interface (API) that defines functions for feeding input data to the acceleration engine 312 and defining the operation to perform on the input data. In this and other examples, the driver 322 can configure the acceleration engine 312 to perform the operation. For example, the driver 322 can identify a neural network that the acceleration engine 312 is to execute, as well as the location in the processor memory 304 or on the storage device 306 where the compiled code 344 for the neural network is located. The driver 322 can further load into the acceleration engine 312 or cause the acceleration engine 312 to load the compiled code 344, can load or cause the acceleration engine 312 to load the input data on which the neural network is to operate, and/or can cause the acceleration engine 312 to begin executing on the input data. Once the acceleration engine 312 has finished, the acceleration engine 312 can notify the driver 322, and the driver 322 can deliver a result back to the application that requested the result.

Figure 4A:
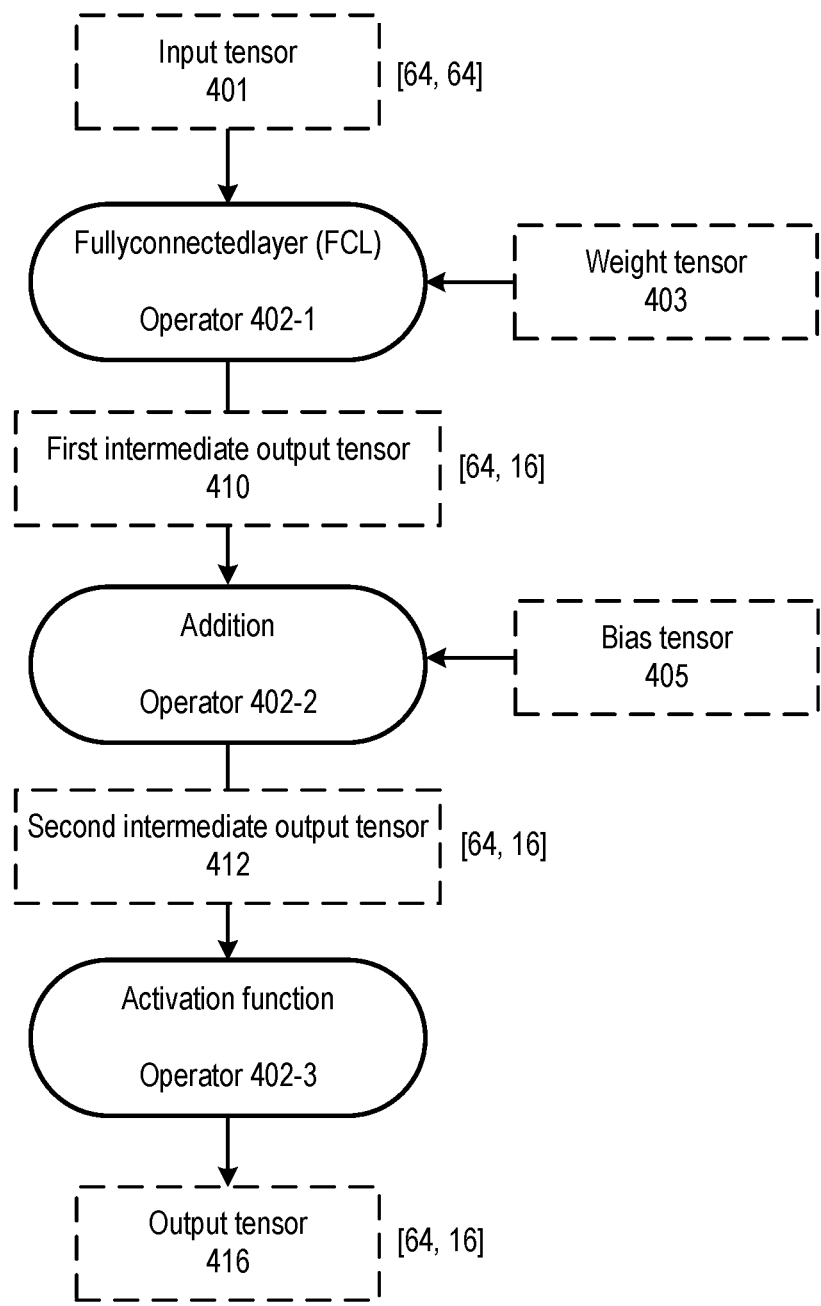
FIG. 4A and FIG. 4B illustrate examples of a dataflow graph of a neural network model and data processed by the dataflow graph.

FIG. 4A illustrates an example graph 400 of a neural network having multiple operators 402 and multiple constants, such as weight tensor 403 and bias tensor 405. Graph 400 can be an intermediate output of compiler 330, such as output 338 of FIG. 3. The operators 402 and the constants are interconnected by arrows which indicate the flow of data within the graph 400. Each of the operators 402 has an operator type, which includes a fully connected layer operator ("FCL"), addition operator ("Add"), and an activation function operator (e.g., ReLU). A fully connected layer operator can represent the operations of layer 106 and/or layer of 108, where a node receives inputs from all nodes from a previous layer, multiplies each input with a weight, and then sums them to generate an intermediate output. The weight can be selected from a weight tensor mapped to the previous layer, and each node in the previous layer can be assigned a weight in the weight tensor based on the mapping. The activation function operator can apply an activation function on each element of a tensor to generate an activation function output.

In the illustrated example, an input tensor 401 is received by FCL operator 402-1, which also receives a weight tensor 403. FCL operator 402-1 can generate a first intermediate output tensor 410. Intermediate output tensor 410 is then processed by addition operator 402-2, which can add a bias from bias tensor 405 to each element of first intermediate output tensor 410 to generate a second intermediate output tensor 414. Activation function operator 402-3 can then apply an activation function (e.g., ReLU) to each element of second intermediate output tensor 414 to generate output tensor 416. Output tensor 416 can represent, for example, a classification output of input tensor 401.

Figure 4B:
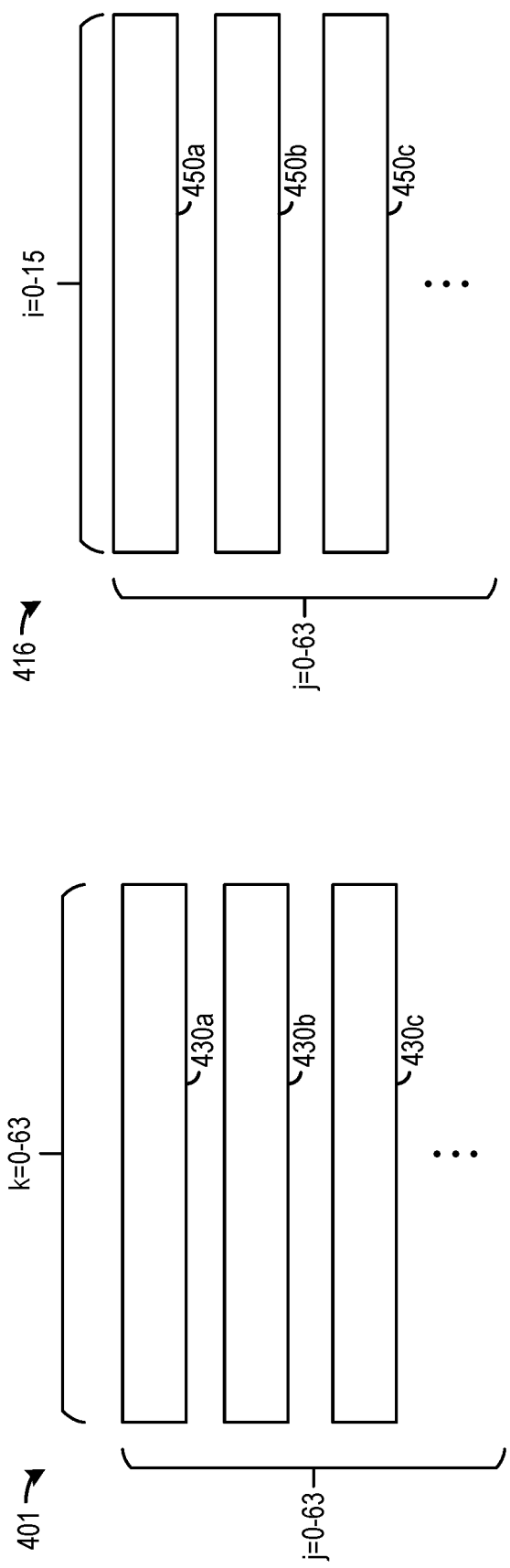

Each tensor in FIG. 4A can be a multi-dimensional tensor. For example, each of input tensor 401, intermediate output tensors 410 and 412, and output tensor 416, are two-dimensional (2D), but may have different dimensions. FIG. 4B illustrates input tensor 401 and output tensor 406. As shown on the left of FIG. 4B, input tensor 401 can include 64 1-D (one-dimensional) tensors 430, such as 430a, 430b, 430c, etc. Each tensor 430 can have 64 elements, each associated with an index k from 0-63. Moreover, as shown on the right of FIG. 4B, output tensor 406 can include 64 1-D tensors 450 (e.g., 450a, 450b, 450c, etc.), each associated with an index j from 0-63. Each 1-D tensor 450 can include 16 elements, each associated with an index i from 0-15.

Each of FCL operator 402-1, addition operator 402-2, and activation function operator 402-3 can perform a set of repetitive operations on each element of the tensors. For example, as described above, FCL operator 402-1 can represent the behavior of a node in a fully connected layer, in which FCL operator 402-1 can perform a set of repetitive multiplication operations between each element of input tensor 401 with a weight from weight tensor 403 to generate a product. In addition, addition operator 402-2 can perform a set of repetitive addition operations between each element of first intermediate output tensor 410 and a bias from bias tensor 405 to generate a corresponding element of second intermediate output tensor 412. Further, activation function operator 402-3 can perform a set of repetitive activation function operations on each element of second intermediate output tensor 412 to generate a corresponding element of output tensor 416.

The repetitive operations in a neural network operator can be represented in the form of loop. A loop has a canonical induction variable that starts at zero and increments by one for each iteration, where the upper bound of the variable does not change during program execution. The induction variable incremented by the loop can be used to index a particular element of the tensor for an operation by the loop. In a case where the repetitive operations involve a multi-dimensional tensor that includes multiple tensors defined along different dimensions, the repetitive operations can be represented in a loop-nest, which may be manifested at certain intermediate representations generated by the compiler. In a simple example, a loop-nest includes an outer loop and an inner loop within the body of the outer loop. The outer loop and the inner loop may each iterate across a different range of values. Each range of values can correspond to a range of a dimension of the multi-dimensional tensor. For example, in a case of a two-dimensional tensor, the first iteration of the outer loop triggers the inner loop, which executes across its entire range of values to index the elements of a first tensor along a first column in multiple iterations. Upon completion of the inner loop, the outer loop moves to a second value within its range of values and again triggers the inner loop, which again executes across its entire range of values to index the elements of a second tensor along a second column in multiple iterations.

Figure 5A:
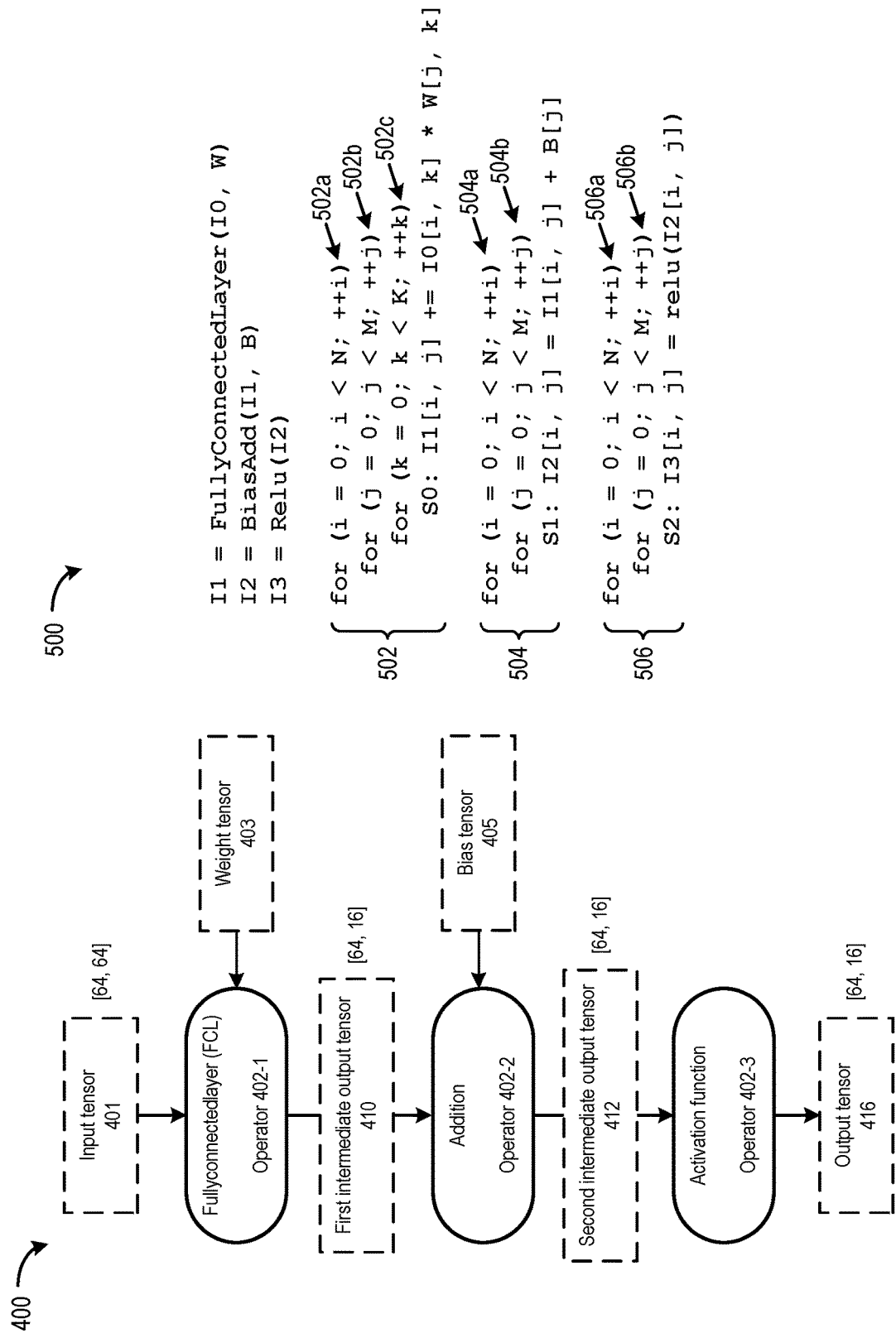

FIG. 5A illustrates an example of loop representation 500 in pseudocode of FCL operator 402-1, addition operator 402-2, and activation function operator 402-3. In loop representation 500, I0 represents input tensor 401, I1 represents first intermediate output tensor 410, I2 represents second intermediate output tensor 412, whereas I3 represents output tensor 416. Moreover, W represents weight tensor 403, while B represents bias tensor 405. FCL operator 402-1 can be represented by a loop-nest 502 including an outer loop 502a and inner loops 502b and 502c. Each loop can increment an induction variable (e.g., i, j, and k) to index an element or a tensor (e.g., I1, I0, and W), and inner loop 502c can include the multiplication and addition operations between an element of I0 indexed by the i and k induction variables and an element of W indexed by the j and k induction variables to generate an element of I1 indexed by the i and j induction variables. In some examples (not shown in FIG. 5A), each element of I0 and W can be associated with indices that are determined in other ways by the induction variables set in each iteration of the loops. As a result of FCL operator 402-1, first intermediate output tensor 410 (represented by I1) having a dimension of [64, 16] can be generated from input tensor 401 (represented by I0) having a dimension of [64, 64]. In addition, addition operator 402 can be represented by a loop-nest 504 including an outer loop 504a and an inner loop 504b. An addition operation is included in inner loop 504b to add each element of I1 indexed by the i and j variables with an element of the bias tensor indexed by the j variable. Addition operator 402-2 generates second intermediate output tensor 412 (I2) having the same dimension ([64, 16]) as first intermediate output tensor 410 (I1). Lastly, activation function operator 402-3 can be represented by a loop-nest 506 including an outer loop 506a and an inner loop 506b. An activation function processing operation (e.g., ReLU) is included in inner loop 506b to apply the activation function on an element of I2 indexed by the i and j variables to output an element of I3 indexed by the same i and j variables. As a result, activation function operator 402-3 also generates output tensor 416 (I3) having the same dimension ([64, 16]) as second intermediate output tensor 412 (I2).

Loop representation 500 can be part of a program generated by a compiler, such as compiler 330, as part of a compilation operation to generate executable instructions for accelerator 202. As to be described below, based on loop representation 500, compiler 330 can determine a schedule of the operations for each of FCL operator 402-1, addition operator 402-2, and activation function operator 402-3 to be performed at accelerator 202.

Figure 5B:
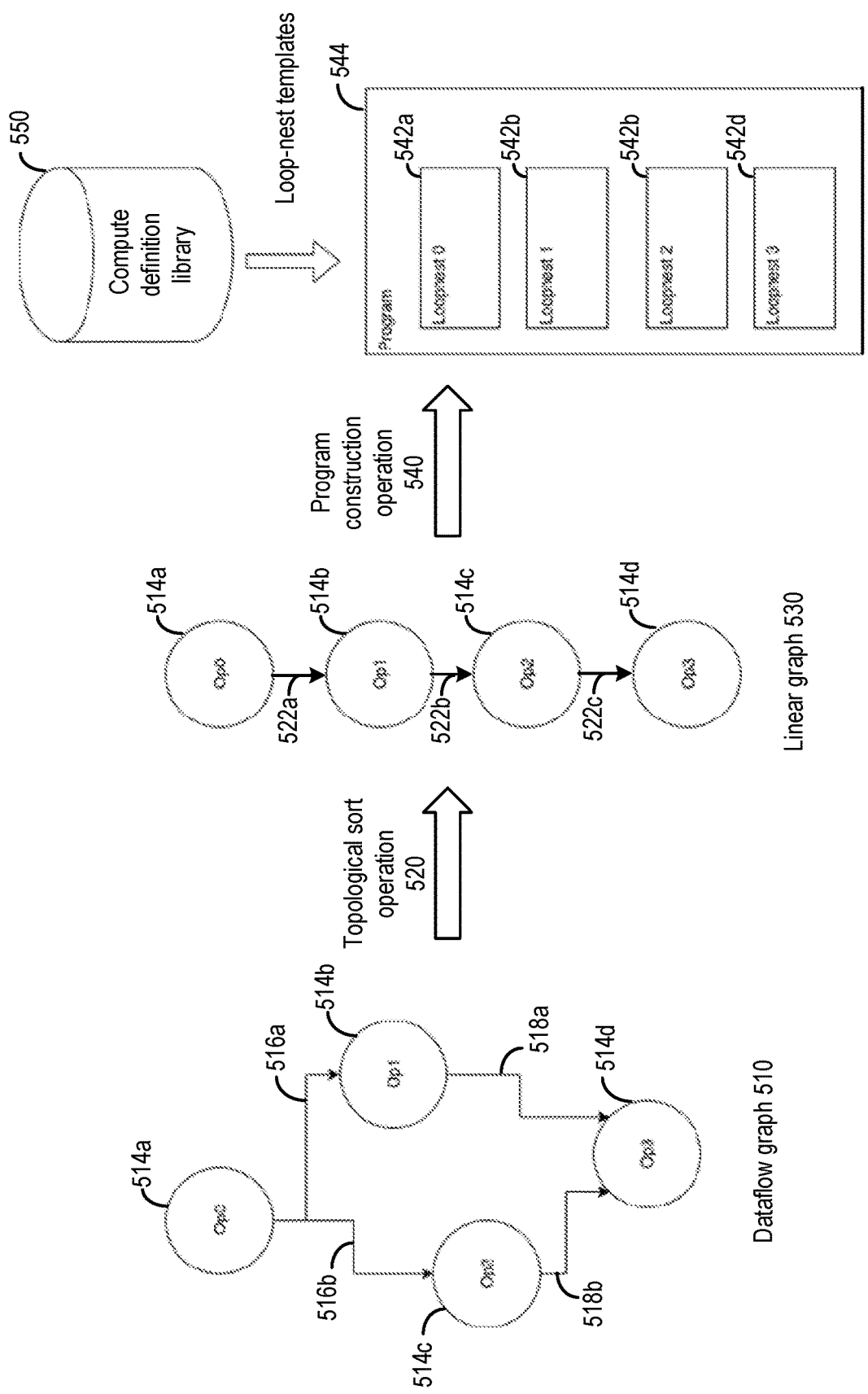

FIG. 5B illustrates example operations by which the compiler can generate a program from a dataflow graph. As shown in FIG. 5B, a dataflow graph 510 may include nodes 514a, 514b, 514c, and 514d, with each node representing a neural network operator (e.g., one of FCL operator 402-1, addition operator 402-2, and activation function operator 402-3) on one or more input tensors to generate an output tensor. Dataflow graph 510 further includes edges 516a, 516b, 518a, and 518b to show the data dependency among the nodes. In dataflow graph 510, node 514b (Op1) is connected to node 514a (Op0) by edge 516a, and the direction of edge 516a indicates that node 514b has data dependency on node 514a. Moreover, node 514c (Op2) is connected to node 514a (Op0) by edge 516b, and the direction of edge 516b also indicates that node 514c has data dependency on node 514a. Further, node 514d (Op3) is connected to nodes 514b and 514c via, respectively, edges 518a and 518b. The direction of edges 518a and 518b indicate that node 514d has data dependency on nodes 514a and 514b.

The compiler can perform a topological sort operation 520 on dataflow graph 510 to generate a linear graph 530 comprising nodes 514a-514d. The topological sort can be performed based on the data dependency among the nodes indicated by edges 516a-b and 518a-b. For example, the compiler can traverse through dataflow graph 510 starting from node 514a and following the direction of the edges, and assign a number to each node based on the order by which the node appears in the traversal path, and the number can represent a position of the node in the topology of dataflow graph 510. The compiler can then sort the nodes based on the numbers assigned to the nodes, and then generate linear graph 530 that reflects the sorted order of the numbers, which in turn reflects the order of the neural operators in the program. For example, in FIG. 5B, the compiler may assign a number 1 to node 514a, a number 2 to each of nodes 514b and 514c, and a number 3 to node 514d. The compiler can then generate linear graph 530 having node 514a first, followed by nodes 514b and then 514c (or nodes 514c and then 514b), with node 514d being the last. Linear graph 530 further includes edges 522a, 522b, and 522c to represent the order of the nodes.

After generating linear graph 530, the compiler can perform a program construction operation 400, in which the compiler traverses through linear graph 530 and translate the neural network operator represented by nodes 514-d into loop-nests 542a-d in program 544. Each neural network operator can be represented by a loop-nest such as loop-nests 502-506 of FIG. 5A, with one or more instructions involving input and output tensors indexed by the induction variables of the loops in the loop-nest. For example, loop-nest 542a represents node 514a, loop-nest 542b represents node 514b, loop-nest 542c represents node 514c, whereas loop-nest 542d represents node 514d. The order by which each loop-nest appears in program 544 can be based on the traversal order of linear graph 530, such that loop-nest 542a appears first, followed by loop-nests 542b, 542c, and 542d. In some examples, the compiler can perform a translation operation to translate each neural operator into corresponding loop-nest instructions based on accessing loop-nest templates in a compute definition library 550, which can associate different loop-nest templates with different neural network operators. The compiler can retrieve a loop-nest template for each neural network operator represented in linear graph 530, assign variables for the input and output tensors for the neural network operator, and include the loop-nest template in program 544.

After including the loop-nest templates in program 544, the compiler may perform additional processing on program 544, such as loop fusion, to fuse multiple loop-nests together into a single loop-nest while preserving the original behavior of the multiple loop-nests. Loop fusion operation can be performed based on identifying loops (or loop-nests) that have a common induction variable range, and putting the instructions of those loops under a single loop. FIG. 5C illustrates examples of loop fusion operation on loop representation 500. As shown in FIG. 5C, loop-nests 502, 504, and 506 share common ranges for induction variables i (from 0 to N−1) and j (from 0 to M−1). Therefore, the compiler can put the instructions of loop-nest 502 (including loop 502c and instruction S0)), loop-nest 504 (instruction S1), and loop-nest 506 (instruction S2) under a single loop-nest 560 including loop 560a (with induction variable i) and loop 560b (with induction variable j) in a fused loop representation 562. As to be described below, the compiler can perform a global modulo allocation operation on a fused loop representation of a neural network dataflow graph to optimize the scheduling of the neural network operations.

Figure 5D:
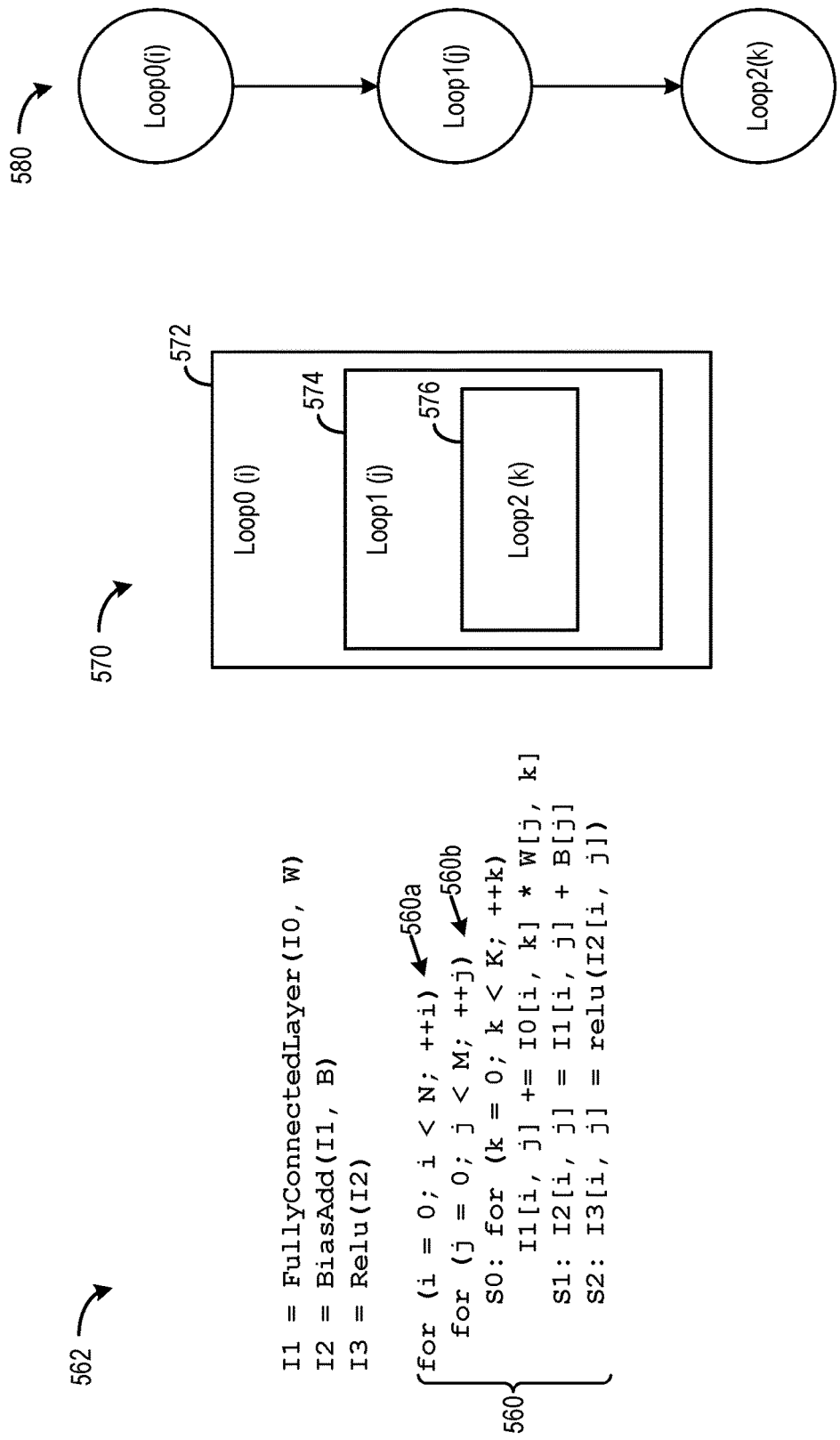

The loop-nests shown in FIG. 5C can be represented in a hierarchy. Examples of hierarchical representation of fused loop representation 562 are shown in FIG. 5D. As show in FIG. 5D, fused loop representation 562 can be represented in a box hierarchy 570. Each box represents a loop, with a box of an outer-loop enclosing a box of an inner-loop. Loop0, with induction variable i, is represented by box 572, whereas loop1, with induction variable j, is represented by box 574. Moreover, loop2, with induction variable k, is represented by box 576. In box hierarchy 570, box 572 of loop0 encloses box 574 of loop1 to indicate that loop1 is nested within loop0 whereas box 576 of loop2 is enclosed within box 574 of loop1 to indicate that loop2 is nested within loop1. In addition, fused loop representation 562 can also be represented in a tree hierarchy 580, with loop0 being a parent loop of loop1, and loop1 being a child loop of loop0 In addition, loop1 is a parent loop of loop2, while loop2 is a child loop of both loop1 and loop0.

Figure 6A:
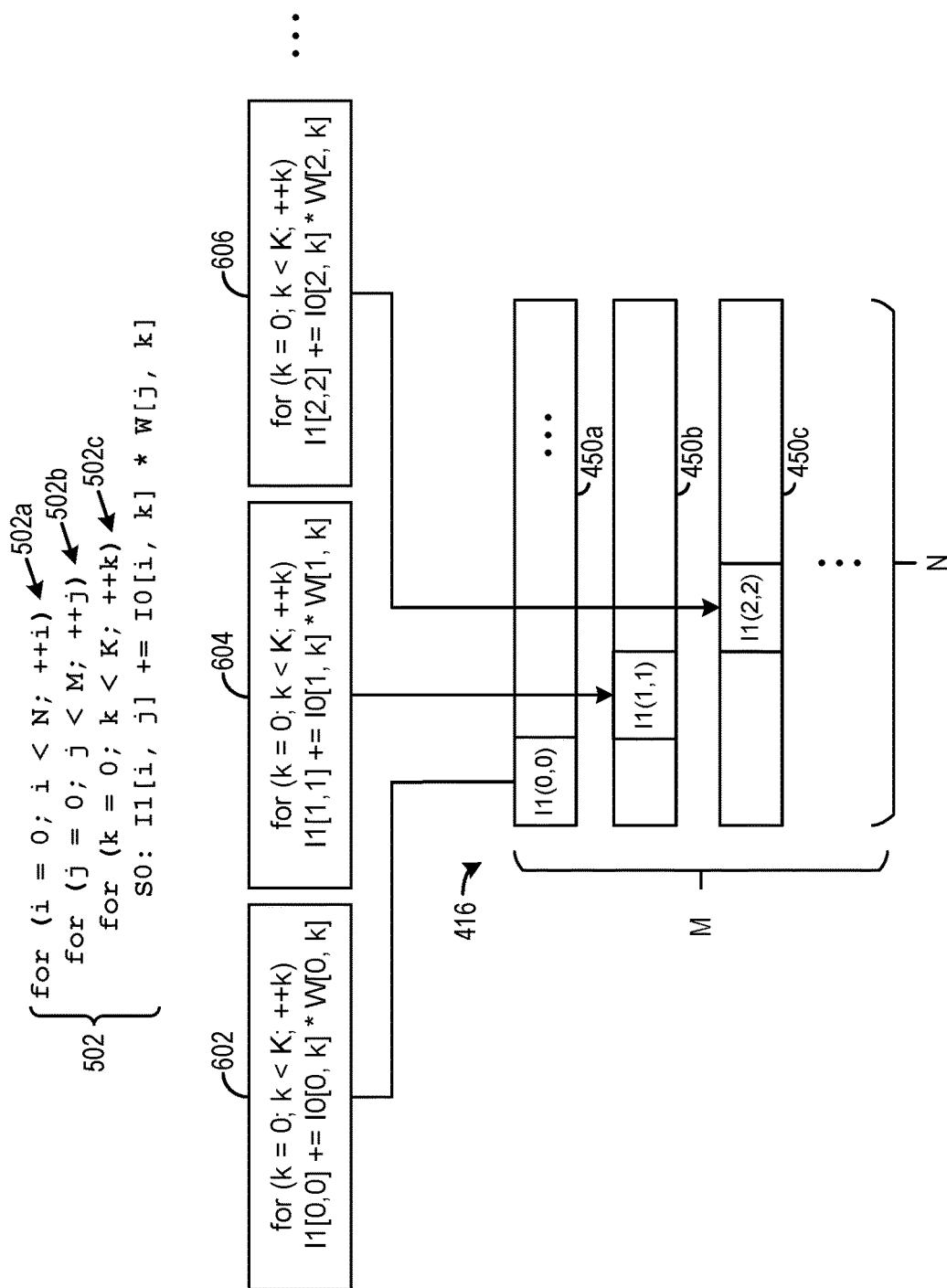

In some examples, a loop of the aforementioned neural network operator may have no loop-carried dependency between iterations, where the operation in one iteration does not depend on output generated by the operation in another iteration. This allows the compiler to schedule the different iterations to be executed in parallel, instead of executing each iteration sequentially. FIG. 6A illustrates an example of parallel execution of iterations of loop-nest 502 for a fully connected layer (FCL) operator. As shown in FIG. 6A, each element of output tensor 416, represented by I1($i, j$), can be independently generated by summing the products of I0($i, k$) and W($j, k$) for a range of k between 0 and K. For example, the computation of I1(0,0) is based on summing the products of I0(0, k) and W(0, k) over the range of k in iteration 602 of a loop-nest comprising loop 502a and loop 502b (corresponding to i=0 and j=0). Also, the computation of I1(1,1) is based on summing the products of M(1, k) and W(1, k) over the range of k in iteration 604 of the loop-nest (corresponding to i=1 and j=1). Further, the computation of I1(2, 2) is based on summing the products of I0(2, k) and W(2, k) over the range of k in iteration 606 of the loop-nest (corresponding to i=2 and j=2). On the other hand, there is no loop-carried dependency for loop 502a (induction variable i) nor loop-carried dependency for loop 502b (induction variable j). For example, the computation of I1(1, 1) does not depend on the computation of I1(0, 0). Moreover, the computation of I1(2, 2) also does not depend on the computation of I1(0, 0) and I(1, 1). Therefore, there is no loop-carried dependency within loop 502a or loop 502b. There is, however, loop-carried dependency within loop 502c due to the accumulation of products of I0 and W across different iterations of loop 502c.

Since there is no loop-carried dependency within loop 502a or loop 502b, each iteration of loop 502a and loop 502b can be executed in parallel for computation of a particular element j). In the example of FIG. 6A, loop 502a has N iterations (as i increments from 0 to N−1) and loop 502b has M iterations (as j increments from 0 to M−1); a total of N×M iterations of the S0 instruction, each involving the computation of a particular element of I1($i, j$), can be executed in parallel, provided that the neural network hardware accelerator has sufficient computation resources to support the parallel execution of N×M iterations (e.g., sufficient number of processing engines 211), and that the neural network hardware accelerator has sufficient memory resources (e.g., sufficient space in memory subsystem 204) to store the N×M elements of I1 at N×M different memory addresses at the same time. On the other hand, if the neural network hardware accelerator cannot support the parallel execution of N×M iterations, allocating the memory space to store the N×M elements of I1 at the same time can lead to inefficient usage of the memory resources of the neural network hardware accelerator.

Figure 6B:
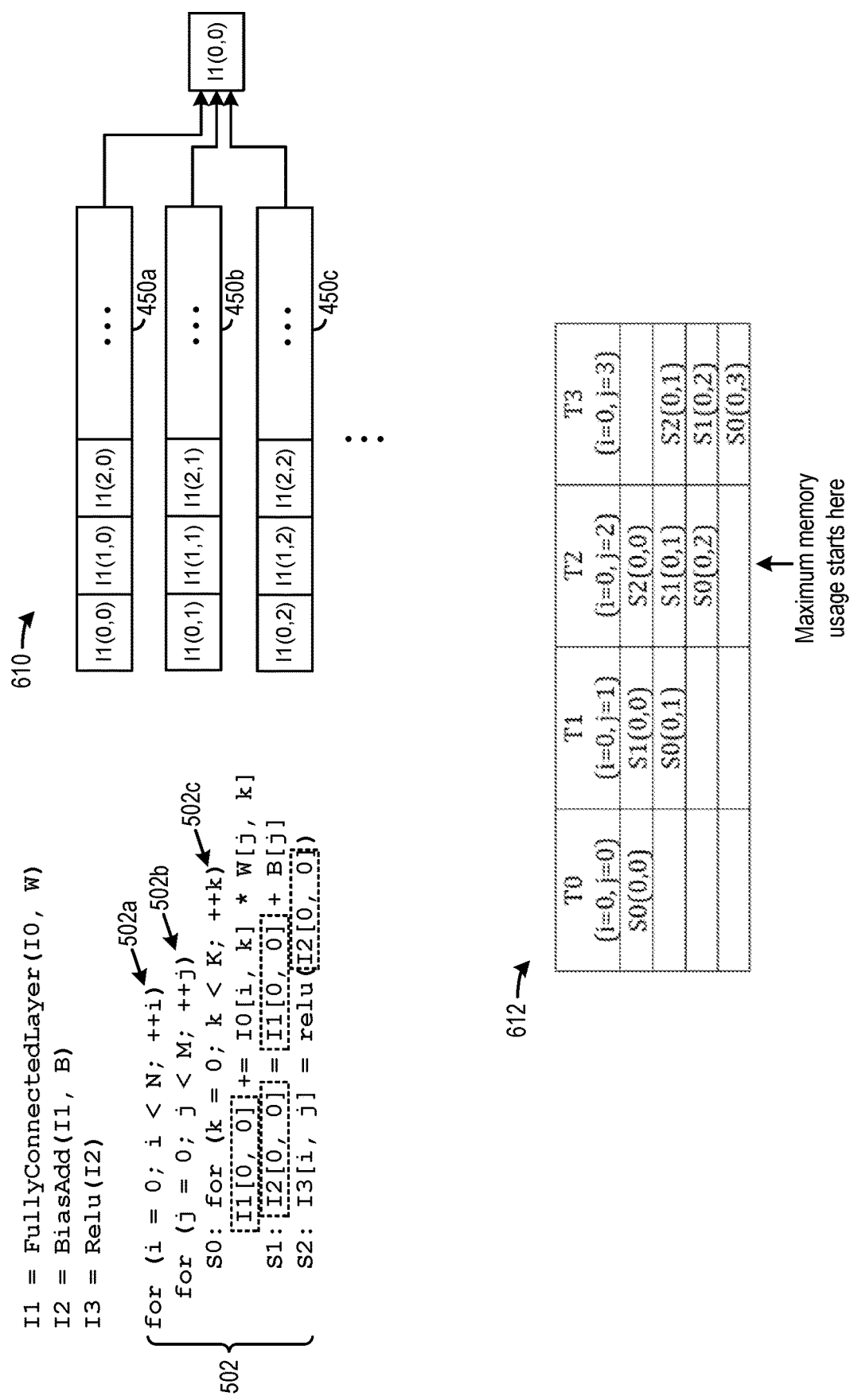

To reduce the usage of the memory resources, a compiler (e.g., compiler 330) can perform an array contraction operation on loop-nest 502, where a single memory element is provided to store some of the tensors, such as I1. FIG. 6B illustrates an example of an array contraction operation. Referring to FIG. 6B, in each iteration of the loop-nest comprising loops 502a and 502b, instead of writing to a memory address corresponding to I1($i, j$) and I2($i, j$) indexed by the i and j variables, instructions S0 and S1 write to the memory address corresponding to elements I1(0, 0) and I2(0, 0), which are highlighted in dotted boxes. Before the end of an iteration of the loop-nest, the content stored at I1(0, 0) can be read to compute I2(0, 0), and the content stored at I2(0, 0) can be read to compute I3($i, j$). And then the next iteration can overwrite I1(0,0) and I2(0, 0). With such arrangements, as shown in mapping 610, the entire N×M elements of output tensor 416 (comprising tensors 450a-450c and represented by I1(0, 0), I1(0, 1), I1(1, 1), etc.) can be mapped to (and stored at) a single memory address of I1(0, 0), albeit at different times, which can substantially reduce the memory footprint by the execution of the loop-nest. On the other hand, as I3 is not read/consumed within loop-nest 502, array contraction operation is not performed on I3 to preserve all elements of I3 in the memory, so that I3 can be accessed by other instructions outside loop-nest 502. Although not shown in mapping 610, it is understood that the entire N×M elements of I2 can also be stored at a single memory address of I2(0, 0).

On the other hand, as the content of I1(0, 0) may need to be read before a new iteration can start, each iteration of the loop-nest is executed sequentially, with one iteration of each of S0, S1, and S2 instructions being executed at a given time. Schedule 612 is an example schedule of execution generated by the compiler based on the memory constraint imposed by the array contraction operation, and based on data dependencies. For example, as shown in schedule 612, at time T0 the compiler can schedule a first iteration of S0 instruction corresponding to i=0 and j=0 (represented by S0(0, 0)) to be executed to generate I1(0, 0). Moreover, based on the data dependency of S1 instruction on S0 instruction, the compiler can schedule the first iteration of S1 instruction corresponding to i=0 and j=0 (represented by S1(0, 0)) to be executed at time T1 to consume I1(0, 0) and generate I2(0, 0). Further, based on the data dependency of S2 on S1, the compiler can schedule the first iteration of S2 instruction corresponding to i=0 and j=0 (represented by S2(0, 0)) to be executed at time T2 to consume I2(0, 0) and generate I3(0, 0).

In addition, the compiler can schedule the execution of a second iteration of S0 instruction corresponding to i=0 and j=1 (represented by S0(0, 1)) to generate a second version of I1(0, 0), after the first version of I1(0, 0) is consumed by the first iteration of S1, within time T1. The compiler can also schedule the execution of a second iteration of S1 instruction corresponding to i=0 and j=1 (represented by S1(0, 1)) at time T2 following time T1, and the execution of a second iteration of S2 instruction corresponding to i=0 and j=1 (represented by S2(0, 1)) at time T3 following time T3, based on the data dependency.

Further, the compiler can also schedule the execution of a third iteration of S0 instruction corresponding to i=0 and j=2 (represented by S0(0, 2)) at time T2 after time T1, a third iteration of S1 instruction corresponding to i=0 and j=2 (represented by S1(0, 2)) at time T3 after time T2, and a fourth iteration of S0 instruction corresponding to i=0 and j=3 (represented by S0(0, 3)) at time T3 after S0(0, 2) at time T2.

In addition, from schedule 612, the compiler can also determine the maximum memory footprint starts at time T2. The memory being used by loop-nest 502 includes three memory addresses to store the outputs of S0, S1, and S2 instructions. The compiler can also perform memory allocation to allocate memory addresses to be used by the S0, S1, and S2 instructions.

The compiler can perform the array contraction operation as part of the compilation operation to generate executable instructions for the neural network hardware accelerator. For example, the compiler can perform the array contraction operation after generating program 544 of FIG. 5B. As part of the array contraction operation, the compiler can parse the loop representations in the program and identify a tensor indexed by the induction variables of the loops that has no loop-carried dependency, and then change the indexing of the tensor in the loops such that the elements of the tensor are mapped to a single memory address. For example, referring back to the example of FIG. 6B, through the array contraction operation, the compiler can change the indexing of the I1 and I2 tensors from induction variables i and j of loops 502a and 502b to constants (e.g., zero), to map the elements of each tensor to a single memory address.

Prior to performing an array contraction operation on a tensor, the compiler can determine whether the tensor has any loop-carried dependency. As described above, the tensor may include a plurality of elements, with each element associated with an index, and a loop's induction variable can set the index of the element to be accessed in an iteration of the loop. In a case where the tensor is multi-dimensional and has multiple tensors, each element can be associated with multiple indices (e.g., i and j in FIG. 5C) in multiple dimensions set by multiple loops, where each index can be set by the induction variable of a different loop. A lack of loop-carried dependency allows each loop iteration that accesses a tensor (of a multi-dimensional tensor) or a tensor element to be executed independently.

The compiler can carry out a two-step test to determine whether there is loop-carried dependency in the tensor. As a first step, the compiler can determine whether the indices along one dimension are set by two different loops, and whether the tensor is written in one loop and read in another loop. If both are true, the compiler may determine there is loop-carried dependency between the two different loops. FIG. 6C illustrates example programs in which there is loop-carried dependency across loops in a tensor. In program 620, each element of a tensor X, indexed by the induction variable i of loop 622, is written by a value based on a tensor A. Each element of tensor X is then accessed in loop 624 to generate a tensor B. As tensor X is written in loop 622 and then read in loop 624, there is loop-carried dependency in tensor X between loops 622 and 624. The compiler may determine not to carry out array contraction for X, so that all elements of tensor X can be readily accessible by loop 624 when it starts.

The first step of the two-step test can also be performed on multidimensional tensor. For example, in program 630, tensor X has a first dimension with an index k set by parent loop 632. Tensor X also has a second dimension which is indexed by an index i set by child loop 634 and indexed by an index j set by child loop 636. In such an example, the compiler may determine not to carry out array contraction along the second dimension. As such, tensor associated with different k indices along the first dimension are stored in different locations of the memory, while at each memory location tensor elements associated with different i/j indices along the second dimension (and a particular k index along the first dimension) can be mapped to a set of memory addresses.

On the other hand, for tensors/elements of which the indices of one dimension are set by a single loop, the compiler can carry out a second step of the two-step test to determine whether there is loop-carried dependency based on determining the live interval of each element of the tensor. The live interval of a tensor element can be defined by the logical timestamps of when the tensor element is first written and when it is last read. A determination of whether the tensor has loop-carried dependency can be made if there is overlap between the live intervals of the tensor elements. The logical timestamps can be defined based on the induction variables of the loops when a tensor element is first written and when the tensor element is last read. FIG. 6D illustrates examples of live intervals of a tensor for different loop instructions. The left of FIG. 6D shows a program 640 in which each element of tensor X, indexed by the induction variable i, is updated by a S3 instruction based only on a corresponding element of tensor A indexed by the same induction variable. There is no data dependency between one element of tensor X and another element of tensor X. This is reflected in a live interval table 642 of each element of tensor X. For example, within the loop, the element X(0) is first written and last read by the S3 instruction (X[i]=A[i]*2) at the first iteration corresponding to i=0. Moreover, the element X(1) is first written and last read at the second iteration corresponding to i=1. As the first write and the last read for each element of X is self-contained in a single iteration, there is no loop-carried dependency for X. Therefore, the compiler can perform the aforementioned array contraction operation on tensor X by changing the indexing to zero.

On the other hand, the right of FIG. 6D shows a program 650 in which the element of tensor Y, indexed by the induction variable i, is updated by an S4 instruction based on another element of Y indexed by the induction variable i+1, as well as a corresponding element of tensor B indexed by the induction variable i. As a result, there is data dependency between different elements of tensor Y. This is reflected in a live interval table 652 of each element of tensor Y. For example, within the loop, the element Y(1) is first written by the S4 instruction at the first iteration corresponding to i=0, while the last read of element Y(1) occurs at the second iteration corresponding to i=1 to compute the element Y(2). Moreover, the element Y(2) is first written by the S4 instruction at the second iteration corresponding to i=1, while the last read of element Y(2) occurs at the third iteration corresponding to i=2. As there is overlap in the induction variable i between elements Y(1) and Y(2), the compiler may determine that tensor Y has an loop-carried dependency and does not perform the array contraction operation on the tensor.

FIG. 6E illustrate another example of a program 660 for which array contraction operation can be performed. Program 660 includes a loop-nest including an outer loop 632 and an inner loop 634. The outer loop increments an induction variable i and updates a tensor t[i] indexed by induction variable i, whereas the inner loop increments an induction variable r and generates a partial sum (psum) based on elements of tensor t and a weight tensor. In inner loop 634, index 666 of tensor t is generated based on a combination of induction variables i and r (i−2+r). The compiler may determine, based on various known techniques, that tensor t has no loop-carried dependency for loop 662 and loop 664, and decide to perform the array contraction operation on both instances of tensor t in loop 662 and loop 664.

Although the array contraction operation of FIG. 6B can reduce the memory footprint used by the loop instructions, such an arrangement may require each iteration of the loop to be executed sequentially. This lack of parallelism not only reduces the speed of execution but also leads to underutilization of the computation and memory resources, especially in a case where the neural network hardware accelerator has sufficient computation and memory resources to support parallel execution of at least a number of the iterations.

Figure 7A:
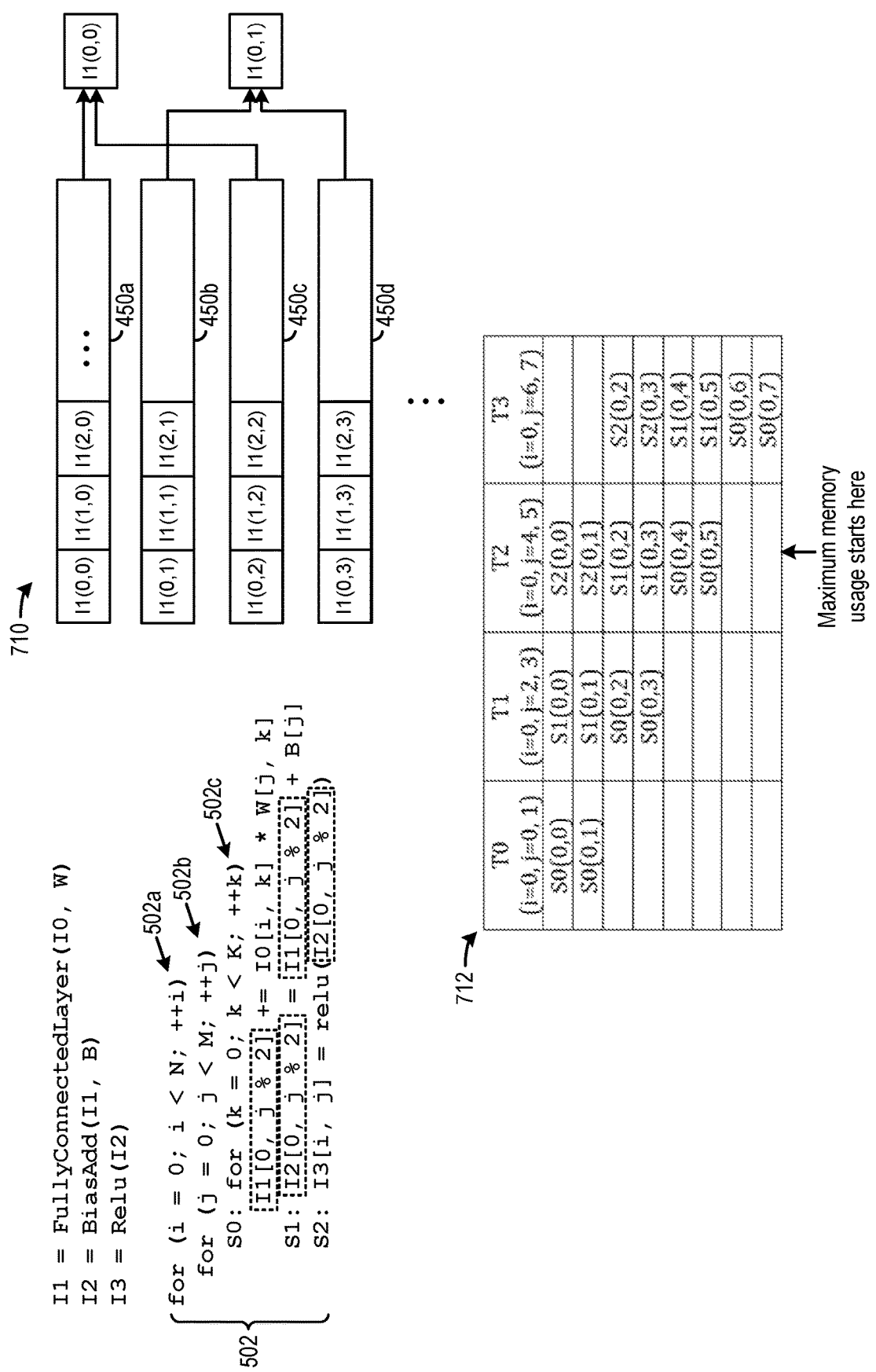
FIG. 7A and FIG. 7B illustrate other examples of loop representation of a neural network dataflow graph having modulo operators.

One way to relax the stringent sequential execution of iterations is by applying a modulo operator on the indexing of the tensor. A compiler (e.g., compiler 330) can apply the modulo operator on the original indexing of the tensor in a program to generate a remainder of the index, after determining that the tensor has no loop-carried dependency based on the two-step test illustrated in FIG. 6C and FIG. 6D. The remainders of the indices, from the modulo operation, can represent a mapping of memory addresses to the elements of the tensor. FIG. 7A illustrates an example arrangement of modulo operators in loop-nest 502. As shown in FIG. 7A, the indexing of tensors I1 and I2 are based on a modulo 2 of the induction variable index j (highlighted in dotted boxes). As the output of a modulo 2 operation is either 0 (if j is an even number) or 1 (if j is an odd number), the output of the S0 instruction can be stored in one of two memory addresses. With such arrangements, as shown in mapping 710, the entire N×M elements of I1 can be mapped to (and stored at) two memory addresses I1(0, 0) and I1(0, 1). For example, elements of I1 having an even j index (e.g., I1(0, 0), I1(0, 2), etc. of tensors 450a and 450c) are mapped to memory address of I1(0, 0), whereas elements of I1 having an odd j index (e.g., I1(0, 1), I1(0, 3), etc. of tensors 450b and 450d) are mapped to memory address of I1(0, 1). Although not shown in mapping 710, it is understood that the modulo 2 operation on the indexing of tensor I2 also maps elements of I2 to two memory addresses of I2(0, 0) and I2(0, 1).

The provision of two memory addresses to store tensor I1 allows two iterations of the S0 instruction to be executed in parallel in a batch, as both iterations can write the output to different addresses simultaneously. Likewise, the provision of two memory addresses to store tensor L2 also allows two iterations of S1 (and S2 instructions, which depend on S1) to be executed in parallel in a batch, followed by another batch including another two iterations of S1 (and S2 instructions).

Schedule 712 is an example schedule of execution generated by the compiler based on the relaxed memory constraint provided by the modulo operator, and based on data dependency. As shown in schedule 712, at time T0, the compiler can schedule first and second iterations of the S0 instructions (represented by S0(0, 0) and S0(0, 1)) to be executed in parallel in a first batch to generate a first version of I1(0, 0) and I1(0, 1). Moreover, based on the data dependency between the S1 instruction and the S0 instruction, the compiler can schedule the first and second iterations of the S1 instruction (represented by S1(0, 0) and S1(0, 1)) to be executed in parallel in a second batch at time T1. Further, based on the data dependency of S2 on S1, the compiler can schedule the first and second iterations of the S2 instruction (represented by S2(0, 0) and S2(0, 1)) to be executed in parallel in a third batch at time T2.

In addition, to allow the overwriting of the first version of I1(0, 0) and I1(0, 1), the compiler can schedule the parallel execution of third and fourth iterations of the S0 instruction (represented by S0(0, 2) and S0(0, 3)) in the second batch at time T1 to generate a second version of I1(0, 0) and I1(0, 1), after the parallel execution of S1(0, 0) and S1(0, 1) completes and consumes the first version of I1(0, 0) and I1(0, 1). The compiler can also schedule the parallel execution of third and fourth iterations of the S1 instruction (represented by S1(0, 2) and S1(0, 3)) at time T2, followed by the parallel execution of third and fourth iterations of the S2 instruction (represented by S2(0, 2) and S2(0, 3)) at time T3, based on the data dependency.

Further, to allow overwriting of the second version of I1(0, 0) and I1(0, 1), the compiler can schedule the parallel execution of fifth and sixth iterations of S0 instruction (represented by S0(0, 4) and S0(0, 5)) in the third batch at time T2 to generate a third version of I1(0, 0) and I1(0, 1), after the parallel execution of S1(0, 2) and S1(0, 3) completes and consumes the second version of I1(0, 0) and I1(0, 1). The compiler can also schedule the parallel execution of fifth and sixth iterations of the S1 instruction (represented by S1(0, 4) and S1(0, 5)) at time T3, followed by the parallel execution of fifth and sixth iterations of the S2 instruction (represented by S2(0, 2) and S2(0, 3)) after time T3 (not shown in schedule 712). Furthermore, the compiler can also schedule the parallel execution of seventh and eight iterations of the S0 instruction (represented by S0(0, 6) and S0(0, 7)) at time T3.

In addition, from schedule 712, the compiler can also determine the maximum memory footprint starting at time T2. The memory being used by loop-nest 502 includes six memory addresses to store the outputs of the S0, S1, and S2 instructions. The compiler can also perform memory allocation to allocate memory addresses to be used by the S0, S1, and S2 instructions.

Figure 7B:
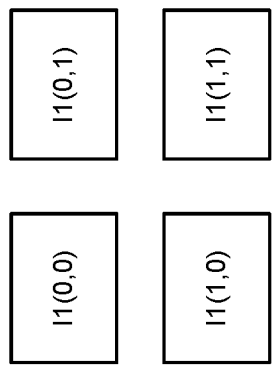

Although FIG. 7A shows a modulo operator for one induction variable (j), it is understood that other induction variables of loop-nest 502, such as induction variable j, can be assigned a modulo operator as well. FIG. 7B illustrates another example of modulo operators on loop-nest 502. As shown in FIG. 7B, the indexing of tensors tI1 and I2 are based on a modulo 2 of the induction variable indices i and j (highlighted in dotted boxes). The results of the modulo operations on indices i and j can produce four different combinations: (0, 0), (0, 1), (1, 0), and (1, 1). Therefore, such arrangements can map the elements of the I1 tensor to four different memory addresses (the product of the modulo operators of loop-nest 502, which is four) associated with I1(0, 0), I1(0, 1), I1(1, 0), and I1(1, 1). This allows four iterations of the S1, S2, and S3 instructions to be executed in parallel at a given time.

As described above, a compiler (e.g., compiler 330) can insert a modulo operator in the indexing of a tensor in program 544 of FIG. 5B, as part of the compilation operation. Similar to the array contraction operation, the compiler can determine whether the tensor has any loop-carried dependencies based on determining the live interval of each element of the tensor as described in FIG. 6C, and then can apply the modulo operators on the tensors that are determined to have no loop-carried dependency.

As described above, the value of the modulo operator can determine a number of iterations of an instruction that can be executed in parallel, as well as the resulting memory footprint used to support the parallel execution of the instruction. For example, for a modulo operator of m, m elements of the tensors are mapped to m different addresses, and m iterations of the loop can be included in a batch to be executed in parallel to access the m different addresses. To improve utilization of the computation and memory resources available for execution of a loop (or loop-nest), the compiler can perform a global modulo allocation operation, in which the compiler can determine the modulo operators for the indexing of tensors in the loops in program 544 of FIG. 5B, based on the computation and memory resources available for execution of the loops. After determining the modulo operators, the compiler can then determine the iterations to be included in batches, as well as a schedule of execution of the batches based on data dependencies similar to schedule 712. The compiler can also allocate memory addresses based on the memory address mapping provided by the modulo operators. The compiler can then generate a set of executable instructions based on the schedule of execution of the batches as well the allocated memory addresses.

Figure 8A:
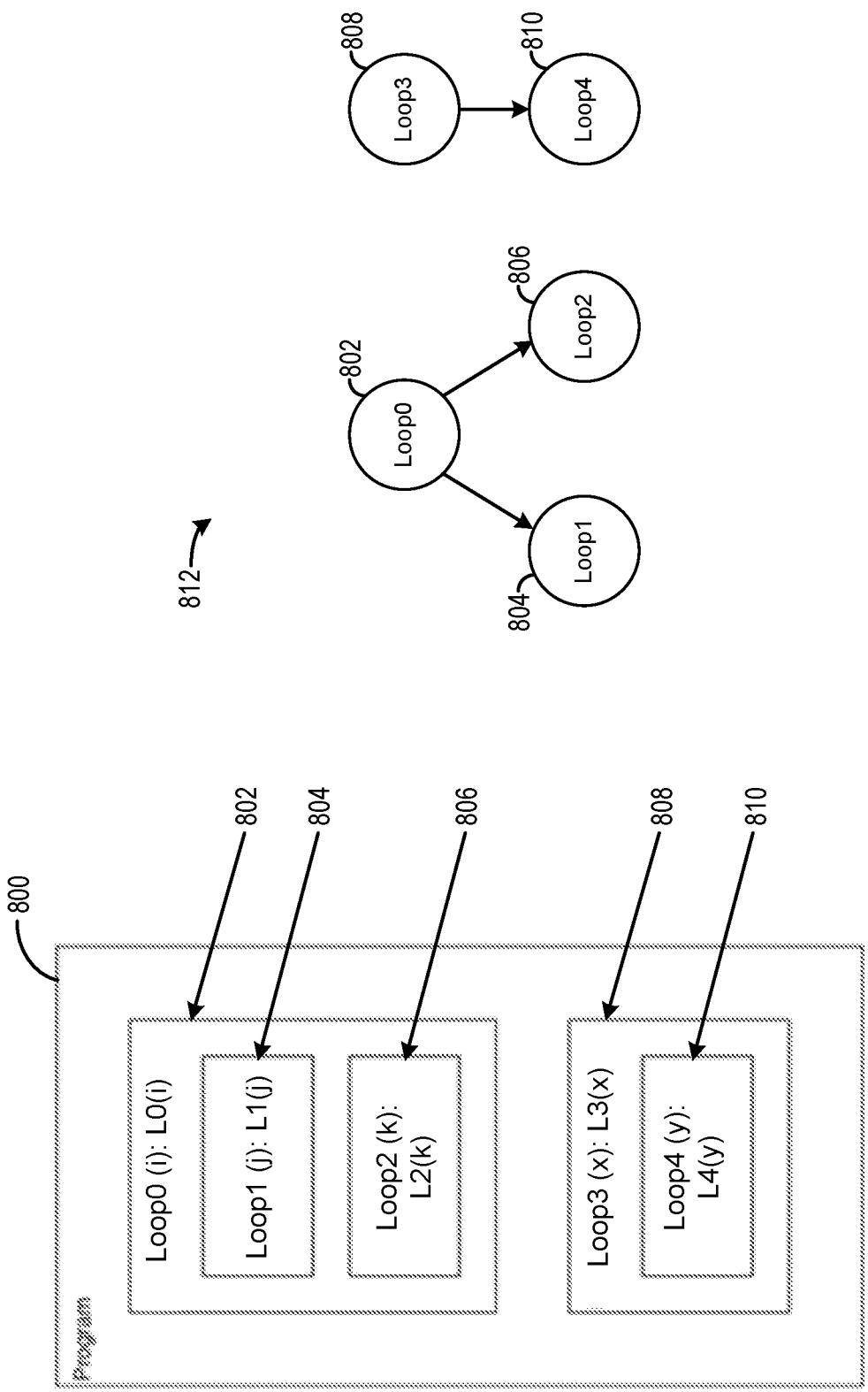

FIG. 8A-FIG. 8G illustrate examples of global modulo operations performed by a compiler (e.g., compiler 330) on a program 800. As shown in FIG. 8A, program 800 can include loops 802, 804, 806, 808, and 810. Referring to the hierarchical tree structure 812 on the right, loops 802, 804, and 806 can form a loop-nest with loop 802 as the parent loop and loops 804 and 806 as the child loops, whereas loops 808 and 810 can also form a loop-nest with loop 808 as the parent loop and loop 810 as the child loop. Each loop can have an induction variable to index a tensor. For example, loop 802 (loop0) can be associated with an induction index i to index a tensor L0, loop 804 (loop1) can be associated with an induction index j to index a tensor L1, loop 806 (loop2) can be associated with an induction index k to index a tensor L2, loop 808 (loop3) can be associated with an induction index x to index a tensor L3, whereas loop 810 (loop4) can be associated with an induction index y to index a tensor L4. In some examples, some of the tensors can be part of a multi-dimensional tensor indexed by multiple induction variables. For example, tensor L0 can correspond to a single tensor 450 (e.g., 450a, 450b, etc.) where the index i is associated with an element of tensor L0, whereas tensor L1 can correspond to a group of tensors 450, each associated with an index j. The loops shown in FIG. 8A may be generated after additional optimization operations, such as the loop fusion operation of FIG. 5C.

From program 800, the compiler can identify tensors that have no loop-carried dependency based on the two-step test described in FIG. 6C and FIG. 6D, and then assign an initial modulo operator for the loops that index these tensors. In the example of FIG. 8A, the compiler can determine that tensors T0-T4 have no loop-carried dependency, and identify loops 802-810 (loop0-loop4) that index these tensors. The compiler can then assign an initial modulo operator for loops 802-810. As described above, the initial modulo operator is to operate on the original indexing of the tensor, such that the indexing of the tensor becomes based on the modulo values. The modulo operator can indicate how many elements of the tensor are mapped to different memory addresses, as well as how many iterations of the loop instruction that accesses the tensor can be executed in parallel.

Figure 8B:
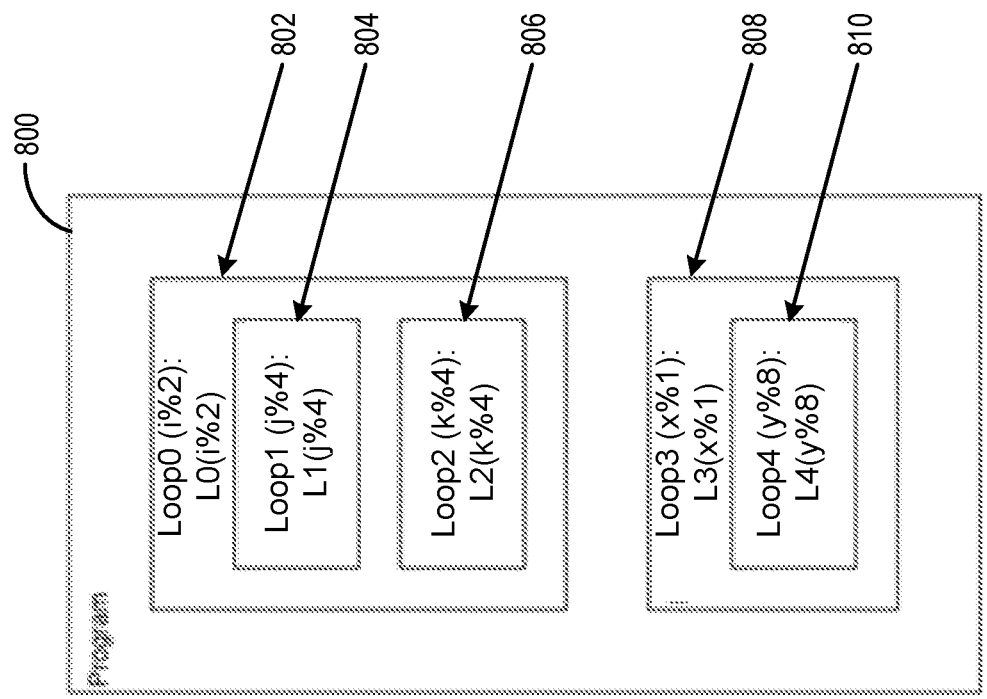
Figure 8B:
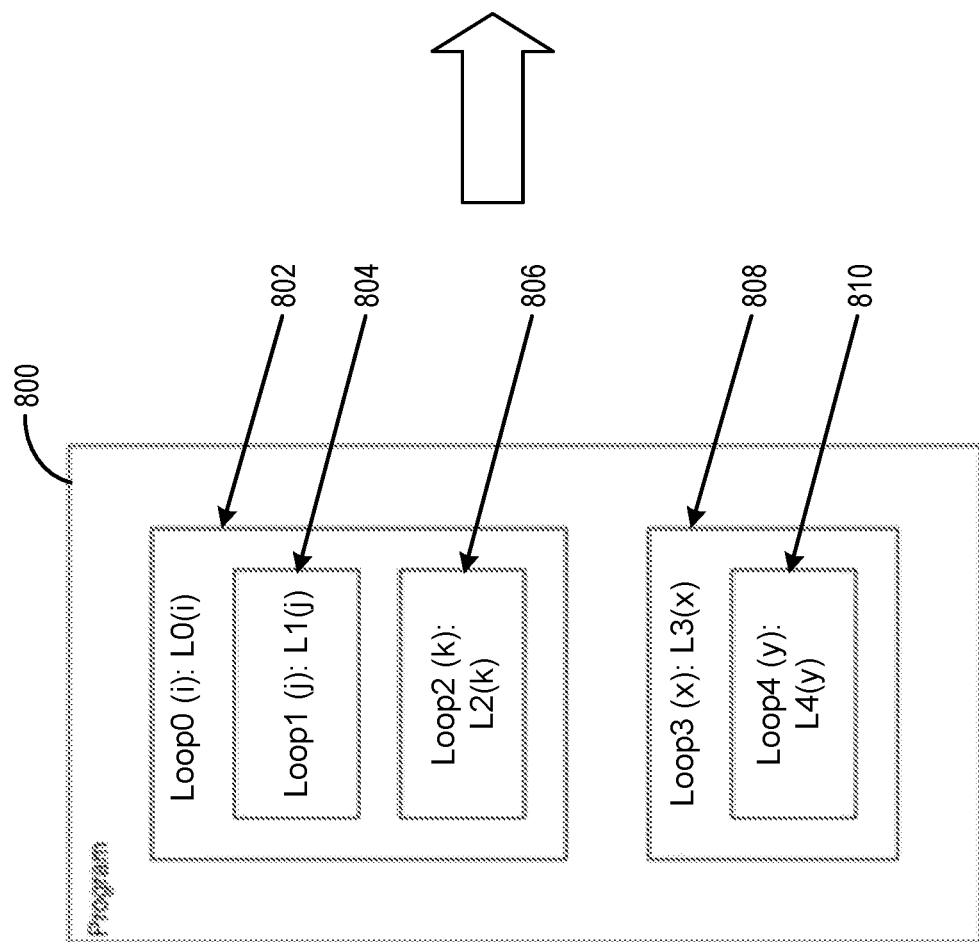

FIG. 8B illustrates an example of the initial modulo operators assigned to loops 802-810. As shown in FIG. 8B, a modulo operator of 2 is assigned to loop 802 (loop0) to change the indexing of tensor L0, and a modulo operator of 4 is assigned to loop 804 (loop1) to change the indexing of tensor L1, whereas a modulo operator of 4 is also assigned to loop 806 (loop2) to change the indexing of tensor L2. As a result of the assignment of these initial modulo operators, two iterations of loop0 can be executed in parallel, and with each iteration of loop0 four iterations of loop1 can be executed in parallel, such that a total of eight iterations of loop1 can be executed in parallel. Likewise, a total of eight iterations of loop2 can also be executed in parallel. Moreover, two memory addresses are allocated by the compiler to store tensor L0, eight memory addresses are allocated to store tensor L1, and eight memory addresses are allocated to store tensor L2.

In addition, a modulo operator of 1 is assigned to loop 808 (loop3) to change the indexing of tensor L3, whereas a modulo operator of 8 is assigned to loop 810 (loop4) to change the indexing of tensor L4. As a result of the assignment of these initial modulo operators, each iteration of loop3 can be executed sequentially, while within each iteration of loop3, eight iterations of loop4 can be executed in parallel. Moreover, one memory address is allocated to store tensor L3, and eight memory addresses are allocated to store tensor L4.

The initial modulo operators for each of loops 802-810 can be determined based on a maximum degree of parallel execution supported by the neural network hardware accelerator, as well as the size of memory space allocated for each tensor. Specifically, the number of iterations made available for parallel execution is equal to the product of initial modulo operators of each loop in a loop-nest. For example, assuming that a loop-nest includes a parent outer loop that indexes elements of a first tensor and a child inner loop that indexes elements of a second tensor, the first tensor is assigned a first initial modulo operator of m and the second tensor is assigned a second initial modulo operator of n, the product m X n can determine the number of iterations made available for parallel execution. That product is typically smaller than or equal to a number of iterations the neural network hardware accelerator can execute in parallel. In the example of FIG. 8B, the compiler may determine that the neural network hardware can support the parallel execution of up to 8 iterations, and limit the total number of iterations of a parent loop and its child loop to be at 8. Therefore, the product of modulo operators for both loops 802 and 808 is capped at 8. In addition, as described above, the initial modulo operator can define how many different elements/tensors are to be mapped to different addresses, with a larger modulo operator mapping to a larger number of elements/tensors to a larger number of addresses and thereby using a larger memory space to store the elements/tensors, and vice versa. The compiler can therefore determine the initial modulo operator also based on the size of the memory space assigned to store the elements/tensors.

In some examples, the compiler can determine the initial modulo operators of the tensors accessed by a loop-nest based on a topology traversal operation similar to FIG. 5B, in which the compiler assigns the initial modulo operators of the tensors indexed by the child loops first based on the allocated memory spaces for the tensors/elements indexed by the child loops. For example, in FIG. 8B, the compiler can determine the modulo operator for loops 804, 806, and 810 (child loops) based on the maximum allocated space for tensors T1, T2, and T4. The compiler can then determine the modulo operators for loops 802 and 808 (parent loops) based on the maximum degree of parallelism of execution supported by the neural network hardware accelerator, such that the products of the modulo operators of the parent loop and its child loop are capped at 8. In some examples, the compiler can also assign the initial modulo operators for the child loops first, followed by the parent loops.

The assignment order of initial modulo operators (parent loop followed by child loops, or vice versa) can be based on the architecture of the system that execute the neural network operators. For example, for a system that has multiple hardware processors, the compiler may preferentially set the initial modulo operators for the parent loop first, followed by the child loops, to manage parallel execution of the parent loops across the multiple hardware processors. On the other hand, for a system that has a single hardware processor with multiple execution engines, the compiler may preferentially set the initial modulo operators for the child loops first, followed by the parent loop, to manage parallel execution of the child loops across the execution engines for each iteration of the parent loop.

The following illustrates excerpts of codes of the compiler to determine the initial modulo operators.
max_accum_modulo_alloc=max(product(m(l_i) for l_i in path p)
//for all possible path p in the loopest)
def assign_modulo_alloc_size (l_i):
for each child loop of l_i:
assign_modulo_alloc_size(child_loop)
if not eligible_for_modulo_allocation(l_i):
return
max_accumu_alloc_size=\
max(enumerate_accu_alloc_size_on_each_path(l_)i)
m_l_i=maxl(MaxParallelism, max_accumu_alloc_sixe)
m[l_i]=min(l_i.tripcount, m_l_i)
def enumerate_accu_alloc_size_on_each_path)l_i, alloc_sixe=1):
if not self.children:
yield alloc_size
return
for child in self.children:
yield from child.enumerate_accu_alloc_size_on_each_path(m[l_i]*alloc_size)

After determining the initial modulo operators, as part of the global modulo allocation operation, the compiler can reduce some or all of the initial modulo operators based on whether the total memory footprint by the tensors exceeds the available memory space. In one example, the compiler can determine the live intervals of elements of tensors, and determine whether there are overlaps in the live intervals. If there are overlaps, the compiler may allocate separate memory addresses for the elements of the tensors, and determine the total memory footprint based on the allocated memory addresses.

Figure 8C:
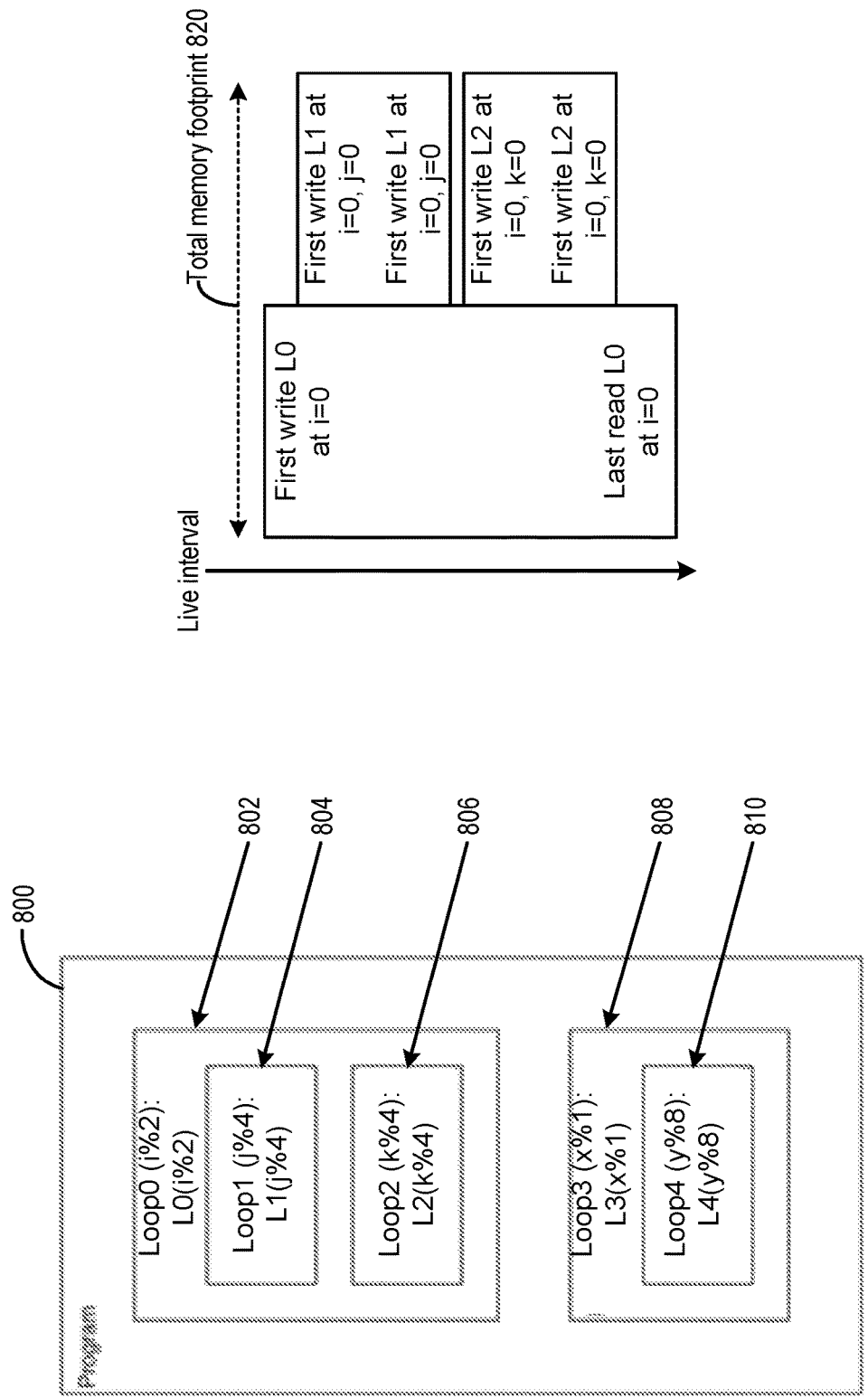

FIG. 8C illustrates an example operation of determining a total memory footprint by the tensors T0, T1, and T2 in loop 802. As shown in FIG. 8C, the compiler can determine the live intervals of elements of tensors T0, T1, and T2. As described above, the live interval is defined based on logical timestamps of a first write and a last read of the tensor element. The logical timestamps can then be defined by the induction variables of the loop for the first write and the last read of a tensor element. In the example of FIG. 8C, T0 is indexed by induction variable i of loop 802 (loop0), while T1 and T2 are indexed by induction variables j and k of loops 804 and 806, respectively. Although neither T1 and T2 are indexed by induction variable i, as both loops 804 and 806 are nested within loop 802, the elements of T1 and T2 are read and written within the live interval of tensor L0 defined by induction variable i. Therefore, the live intervals of T1 and T2 overlap with the live interval of T0, and separate memory addresses are allocated for T0 and T1/T2, such that total memory footprint 820 needed is equal to a sum of the memory space allocated for T0 and the memory space allocated for T1/T2. In addition, the read and write of tensor L1 are enclosed within loop 804 (loop1) and are separate from loop 806. Likewise, the read and write of tensor L2 are enclosed within loop 806 (loop2) and are separate from loop 804. Therefore, the live intervals of T1 and T2 do not overlap, and T1 and T2 can share the same memory addresses. In addition, the compiler can also determine the sizes of memory allocated for each of T0, T1, and T2 based on their initial modulo operators. Based on the live intervals and memory to be allocated for T0, T1, and T2, the compiler can determine total memory footprint 820 needed by T0, T1, and T2.

On the other hand, in a case where L1 and L2 are tensors of a multi-dimensional tensor, the compiler can determine the total number of memory addresses to be mapped to the elements of the multi-dimensional tensor based on a product of the modulo operators, as described above in FIG. 7B.

If total memory footprint 820 at this point is below the available memory space, the compiler can stop the global modulo allocation operation. On the other hand, if total memory footprint 820 is above the available memory space, the compiler can identify an overflowing tensor that cannot fit into the available memory space. In the example of FIG. 8C, the compiler may allocate the memory space for tensor L0 first, followed by tensors T1 and T2, and determine that tensor L1 is the overflowing tensor, since adding the memory footprint of T1 to that of TO causes total memory footprint 820 to go above the available memory space.

Figure 8D:
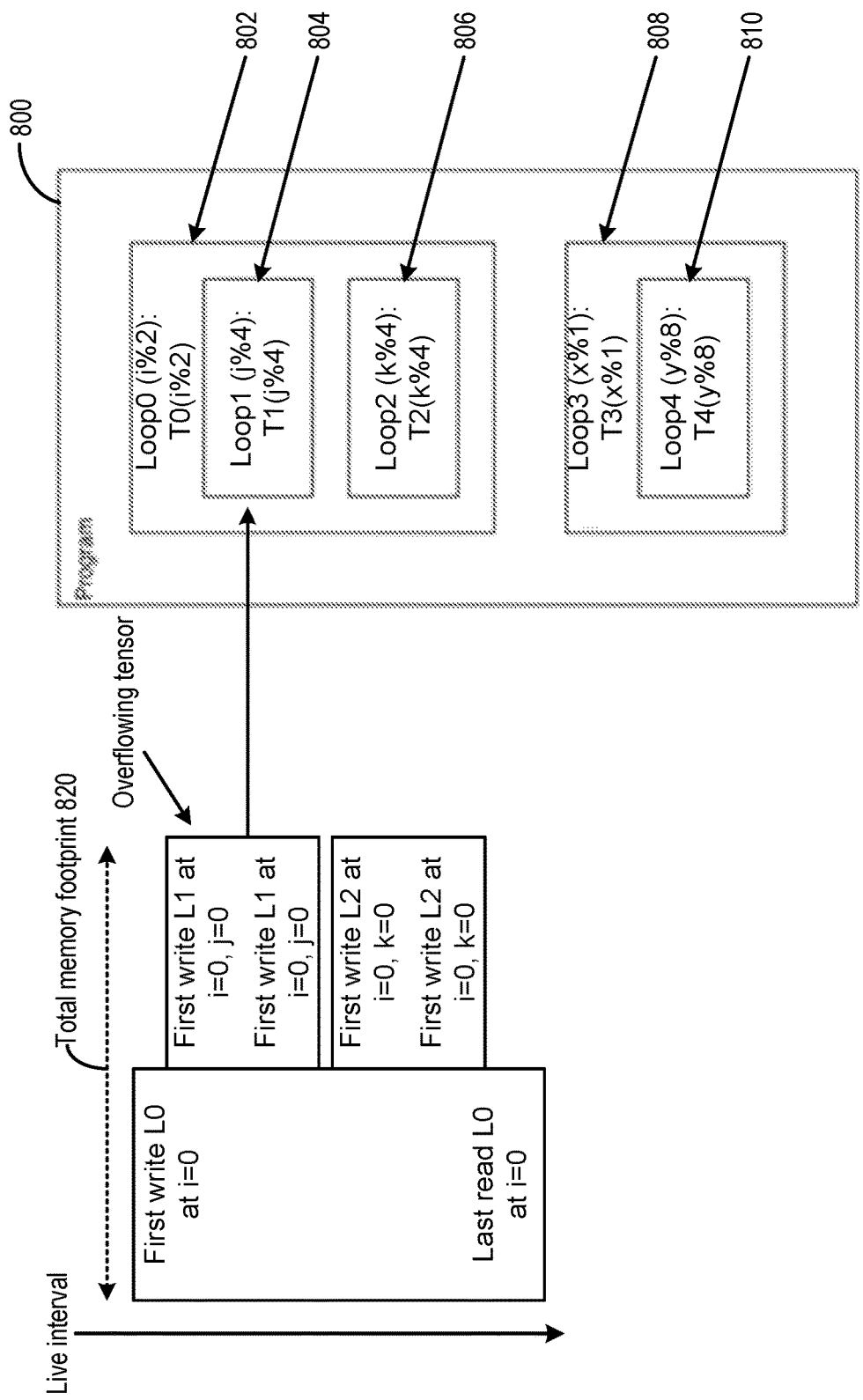
Figure 8E:
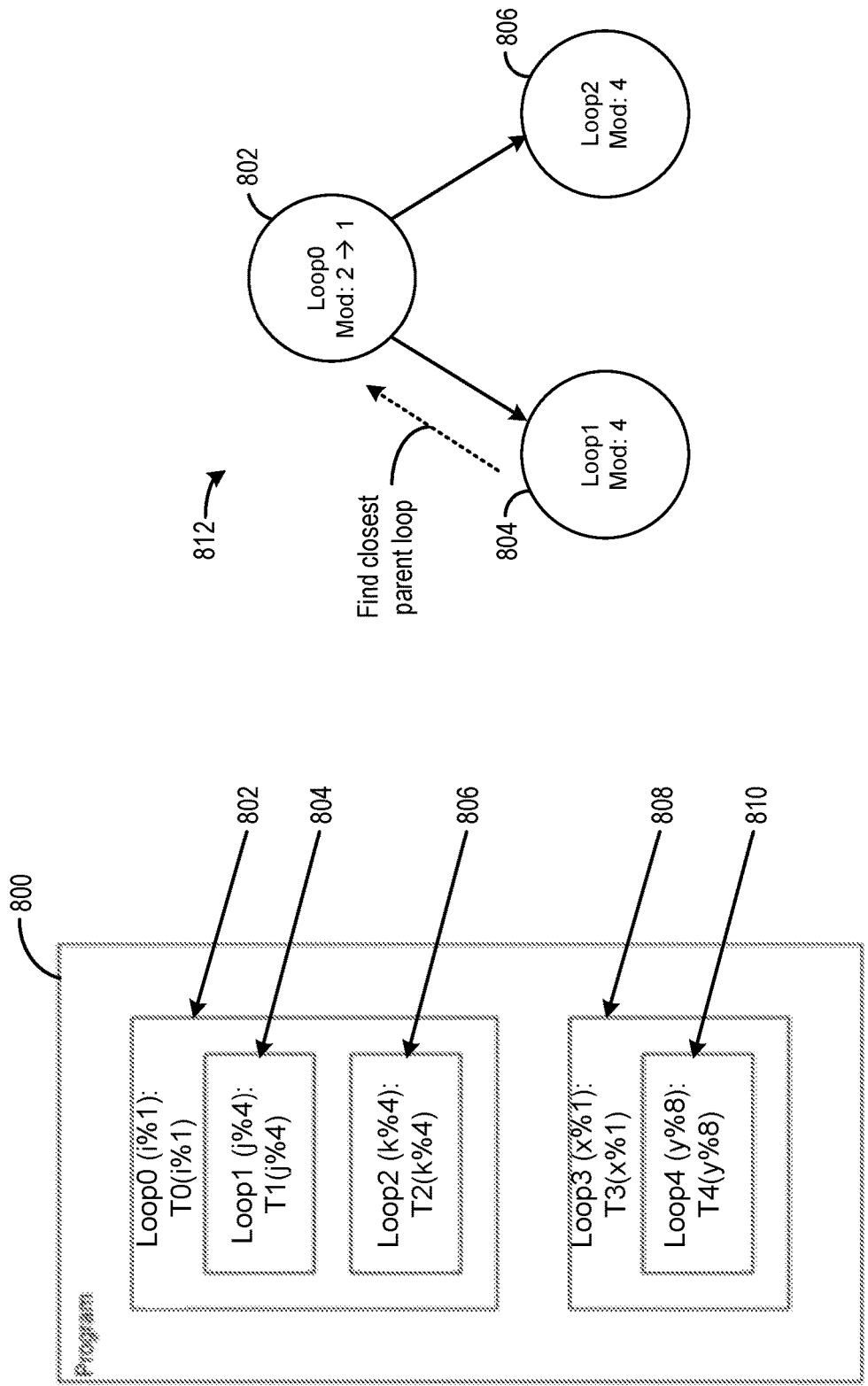

Referring to FIG. 8D and FIG. 8E, to reduce the total memory footprint, the compiler can identify the loop that includes a first write instruction and a last read instruction of tensor L1 (loop 804), and then identify the closest parent loop 804, which is loop 802, based on traversing hierarchical tree structure 812. The compiler can then reduce the initial modulo operator of loop 802 if the initial modulo operator assigned to loop 802 is bigger than one. For example, the initial modulo operator assigned to loop 802 can be reduced by half from 2 to 1. Such arrangements can be more effective in reducing the total memory footprint, since reducing the initial modulo operator of the parent loop can reduce the memory footprint both by the tensor indexed by the loop 802 (TO) and by the tensor indexed by loop 804 (T1). The reduction of the memory footprint by the tensor L0 can be due to mapping the elements of the first tensor to fewer addresses. Moreover, the reduction of the memory footprint by the tensor L0 can be due to reducing the number of parallel iterations of the loop 804 (given by the product of the modulo operators of both loops), which can also reduce the number of addresses mapped to the elements of the tensor L1.

Figure 8F:
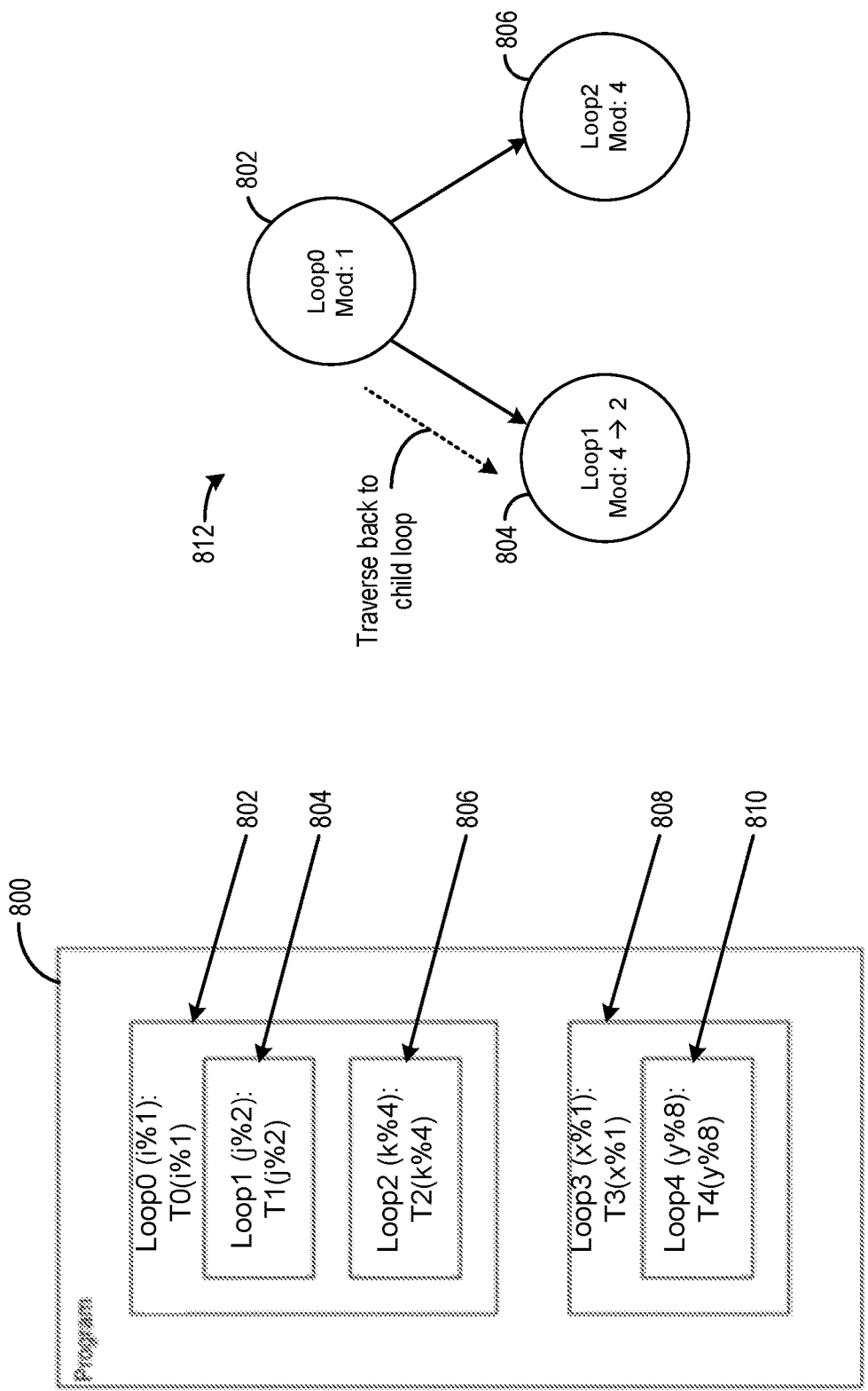

Referring to FIG. 8F, after reducing the initial modulo operator of the loop 802, the compiler can update the memory footprint estimate based on the new modulo operator of the closest loop 802, and determine whether tensor L1 can fit into the available memory space. If tensor L1 can fit, the compiler can stop the global modulo allocation operation. If the tensor L1 still cannot fit, the compiler can further reduce the modulo operator of the loop 802 if the modulo operator is still above one. If the modulo operator of the loop 802 equals one (e.g., after multiple rounds of reduction) as shown in FIG. 8F, such that there is no parallel execution of iterations of loop 802, the compiler can proceed to reduce the modulo operator of loop 804 that indexes tensor L1 (e.g., by half). The compiler can repeat the reduction of the modulo operator of loop 804, or of other child loop (e.g., loop 806) until the total memory footprint is smaller than the available memory space.

FIG. 8G illustrates an example of program 830 having the modular operator added to the indices of tensors. Program 830 can be based on program 660 including outer loop 662 and inner loop 664. As shown in FIG. 8G, the compiler can add a modulo operator M to the index i to the tensor tin loop 662 and in loop 664, based on the techniques described above.

Figure 9A:
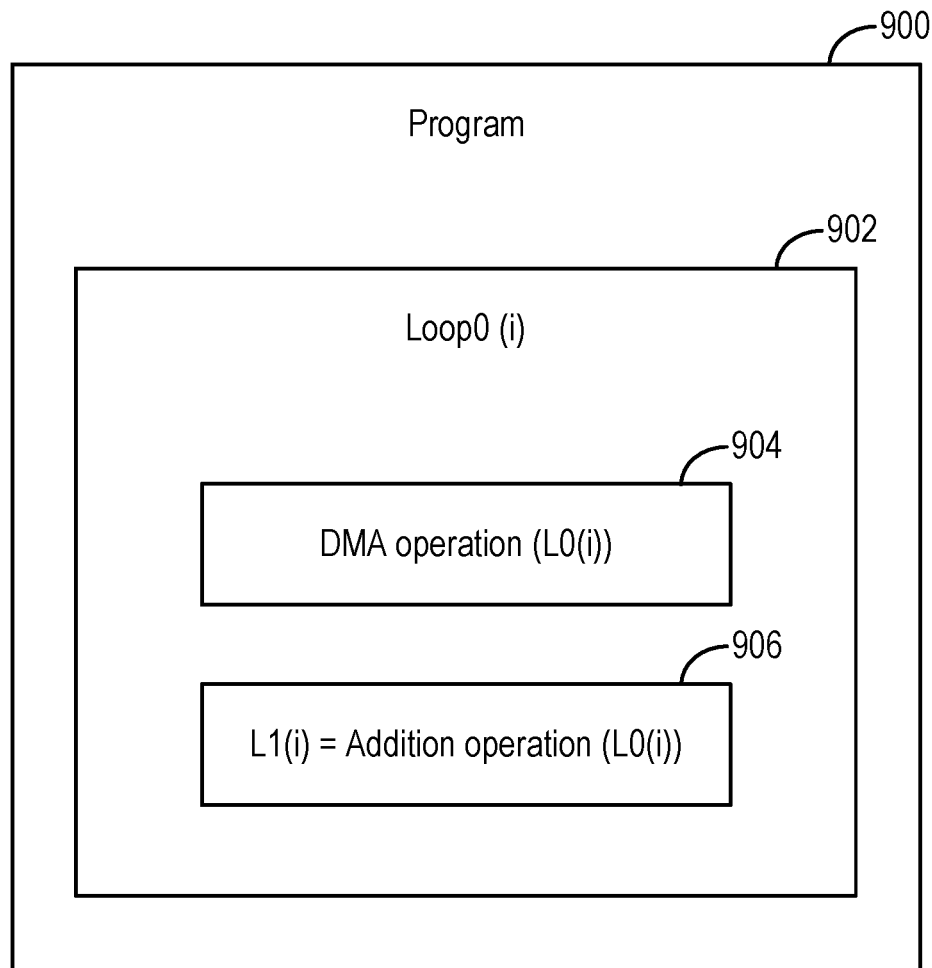
FIG. 9A, FIG. 9B, and FIG. 9C illustrate examples of loop representation of a neural network dataflow graph having direct memory access (DMA) operators.

In some examples, the neural network operator can also include one or more DMA tensors accessed by direct memory access (DMA) instructions to transfer data between an external memory and the local memory (e.g., memory subsystem 204) of the neural network hardware accelerator. The DMA instructions can also be included in the same loop as other neural network operations (e.g., additions, multiply-and-accumulation, activation function processing, etc.). The DMA tensors can be stored in the local memory of the neural network hardware accelerator as the local tensors accessed by other neural network operations. FIG. 9A illustrates an example program 900 including a loop 902 having an induction variable i, with a DMA operation 904 and an addition operation 906 embedded within the body of loop 902. In each iteration of loop 902, a DMA operation 904 can be performed to store data in a tensor L0, whereas addition operation 906 can be performed on tensor L0 to generate tensor L1, with both tensors T0 and T1 indexed by induction variable i. Both tensors T0 and T1 can be stored in the local memory of the neural network hardware accelerator.

In some examples, as part of the global modulo allocation operation, the compiler can determine the modulo operators for the indexing of tensors T0 and T1 to determine the memory footprints of tensors T0 and T1, as well as a number of iterations of DMA operation 904 and addition operation 906 to be executed in parallel in a batch. The compiler can determine the modulo operators for the indexing of tensors T0 and T1 based on the degree of parallelism supported by the neural network accelerator as well as available memory space. The compiler can also estimate the memory footprint of tensors T0 and T1 for a given modulo operator, and adjust the modulo operators until tensors T0 and T1 can fit into the available memory space.

The compiler can determine the memory footprint of tensors T0 and T1 for a given modulo operator based on estimating live intervals of tensors T0 and T1 in the local memory, and adding the footprints of tensor elements having overlapping live intervals, as described above. If the total memory footprint exceeds the available memory space, the compiler may preferentially reduce the modulo operator for tensor L1, before reducing the modulo operator of tensor L0. This can lead to more DMA instructions to be executed in parallel than the number of iterations of other neural network operations, even though the DMA instruction and the neural network operation are defined within the same loop and the DMA tensor and the data tensor being indexed by the same induction variable. Such arrangements can improve the performance of the neural network hardware accelerator, especially in a case where the DMA operations present a substantial bottleneck. Moreover, while the DMA instructions start execution in parallel, they typically do not complete at the same time due to the sequential access of the external memory. As a result, other neural network operations that depend on the DMA operations need not have the same parallelism and can be performed sequentially after the DMA operations complete. As a result, parallelism of the neural network operations can be reduced with minimum effect on the execution speed of these operations, while at the same time reducing the memory footprint of tensors T0 and T1.

After the global modulo allocation operation completes and the modulo operators for the tensors of the program are determined, the compiler can determine a schedule of execution of the different iterations of the loops in the program and the mapping of the tensors to the memory addresses based on the modulo operators. The compiler can perform the scheduling based on data dependency between the tensors, and based on predicting the total completion time of the DMA operations using a delay model, which can account for various sources of delay such as memory access delay, memory data transfer delay over the interconnect, etc. The compiler can then generate executable binary codes that reflect the schedule of execution of the different iterations of the loops in the program.

Figure 9B:
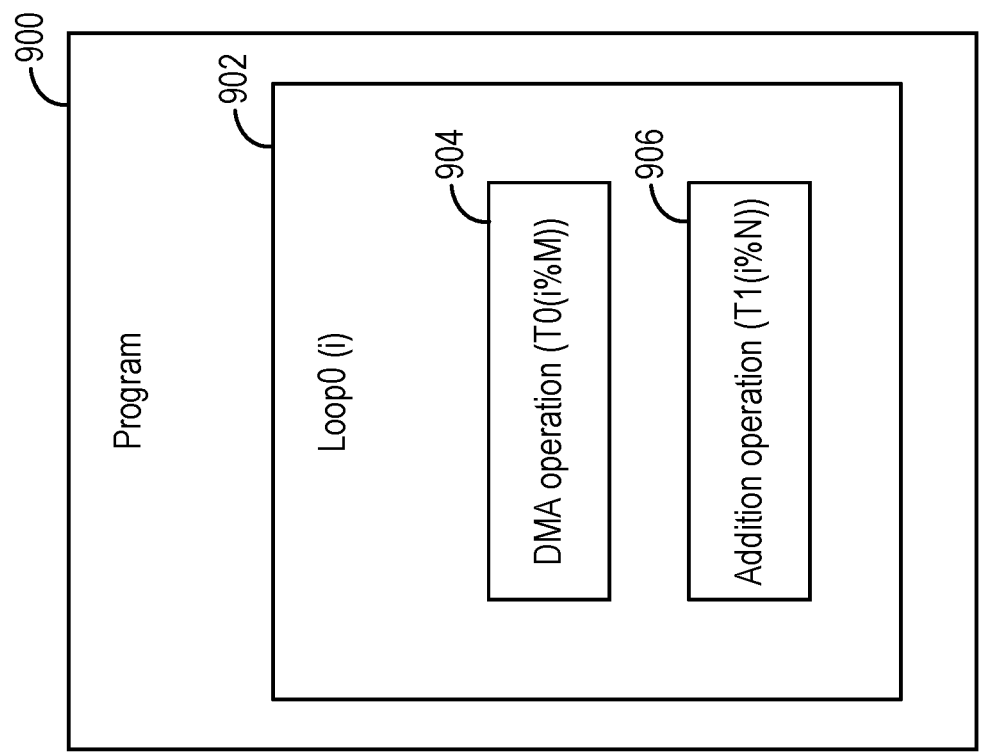
Figure 9B:
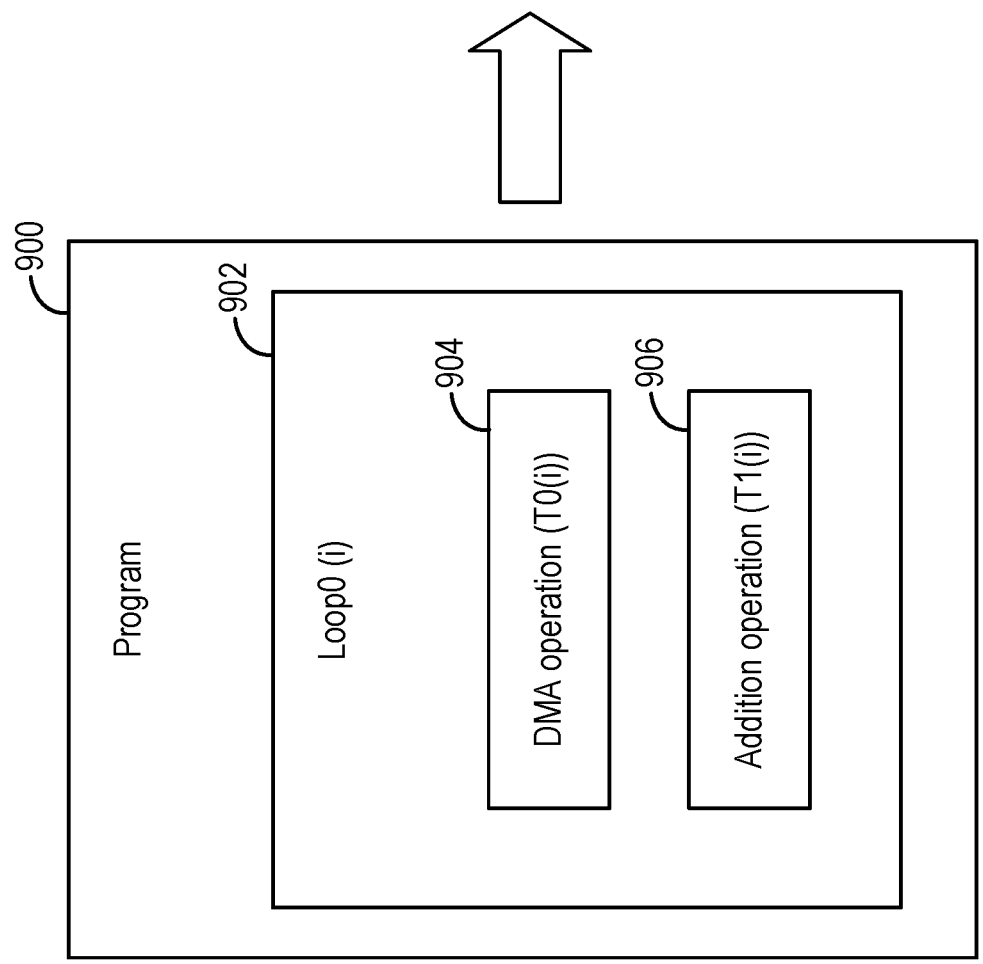
Figure 9C:
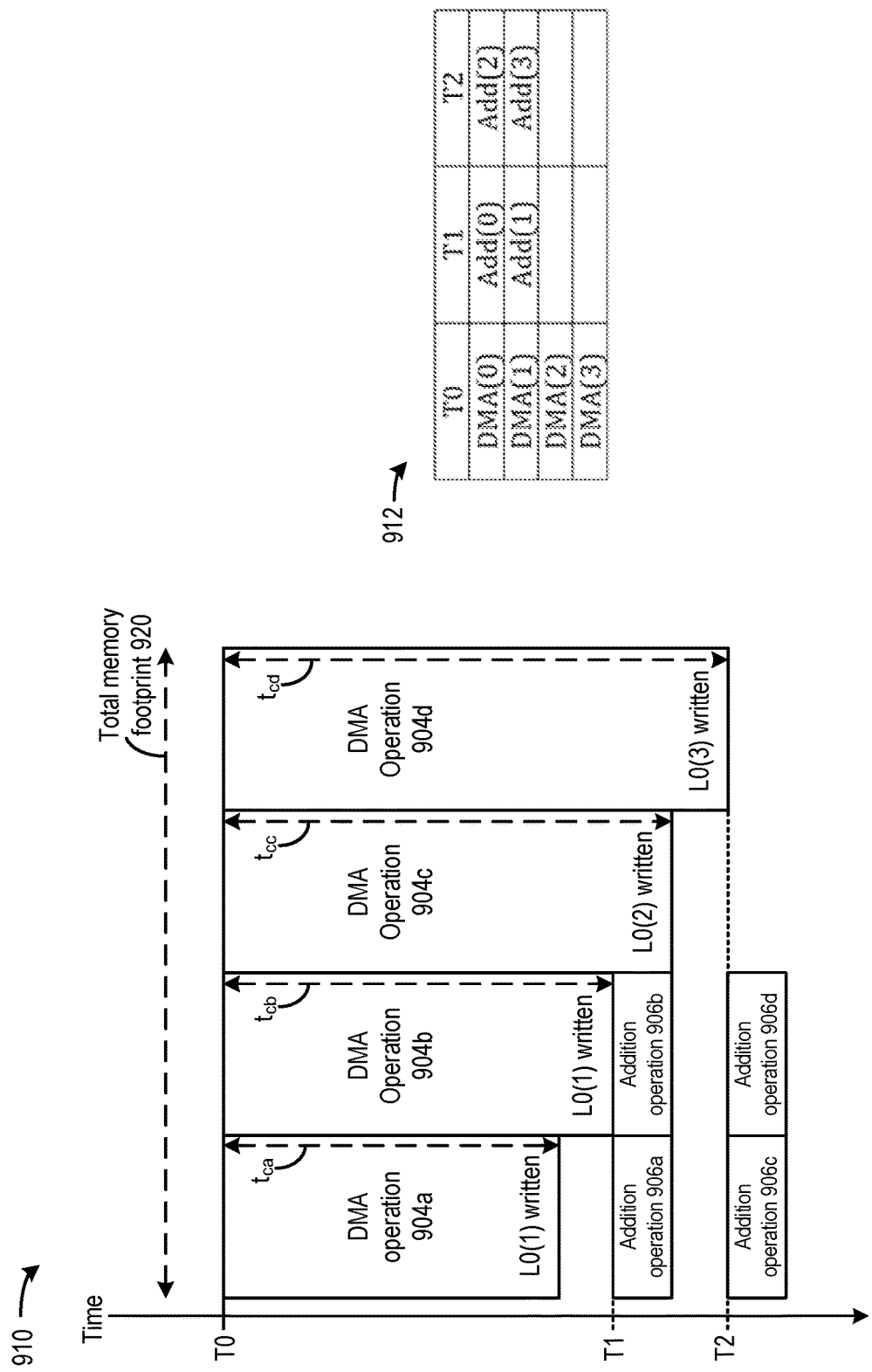

FIG. 9C illustrates an example of scheduling the DMA operation 904 and the addition operation 906. The left of FIG. 9C illustrates a timing diagram 910 of execution of DMA operation 904 and addition operation 906. As shown in timing diagram 910, the compiler may determine a modulo of 4 for DMA operation 904, such that four DMA operations 904 (e.g., DMA operations 904a, 904b, 904c, and 904d) can be executed in parallel, and the footprint of tensor L0, mapped to four different memory addresses, can define total memory footprint 920. The compiler can first schedule DMA operations 904a-d to start execution at time T0. The compiler can also predict a completion time $t_{ca}$, $t_{cb}$, $t_{cc}$ and $t_{cd}$ for, respectively, DMA operations 904a, 904b, 904c, and 904d. The completion time prediction can be based on the aforementioned delay model. Based on the predicted completion time, the compiler can predict that a first subset of the DMA operations being executed in parallel, including DMA operations 904a and 904b, complete by time T1.

Based on the data dependency of addition operations 906a and 906b on DMA operations 904a and 904b, where addition operations 906a and 906b consume tensor elements L0(0) and L0(1) generated by DMA operations 904a and 904b, the compiler can schedule parallel execution of a first group of addition operations, including addition operations 906a and 906b, at time T1. The compiler can also have addition operations 906a and 906b to reuse the memory addresses allocated to DMA operations 904a and 904b such that the compiler does not need to allocate additional memory addresses to addition operations 906a and 906b, and the total memory footprint remains within total memory footprint 920 when addition operations 906a and 906b are executed in parallel with DMA operations 904c and 904d at time T1.

In addition, the compiler can predict that a second subset of DMA operations being executed in parallel, including DMA operations 904c and 904d, complete by time T2. Based on the data dependency of addition operations 906c and 906d on DMA operations 904c and 904d, where addition operations 906c and 906d consume tensor elements L0(2) and L0(3) generated by DMA operations 904a and 904b, the compiler can schedule parallel execution of a second group of addition operations, including addition operations 906a and 906b, at time T2. The compiler can also have addition operations 906c and 906d to reuse the memory addresses allocated to addition operations 906a and 906d, so that the compiler does not need to allocate additional memory addresses to addition operations 906a and 906b.

Schedule 912 on the right of FIG. 9C illustrates the schedule of the execution of DMA operations and addition operations 906 as described above. Specifically, the compiler can schedule DMA operations 904a-904d (represented by DMA(0)-DMA(3)) to start parallel execution at time T0, followed by parallel execution of addition operations 906a and 906b (represented by Add(0) and Add(1)) at time T1, and followed by parallel execution of addition operations 906c and 906d (represented by Add(2) and Add(3)) at time T2. The compiler can also determine that the memory addresses allocated to DMA operations 904a-904d can be reused by addition operations 906a-906d, and do not allocate additional memory addresses for addition operations 906a-906d.

Figure 10:
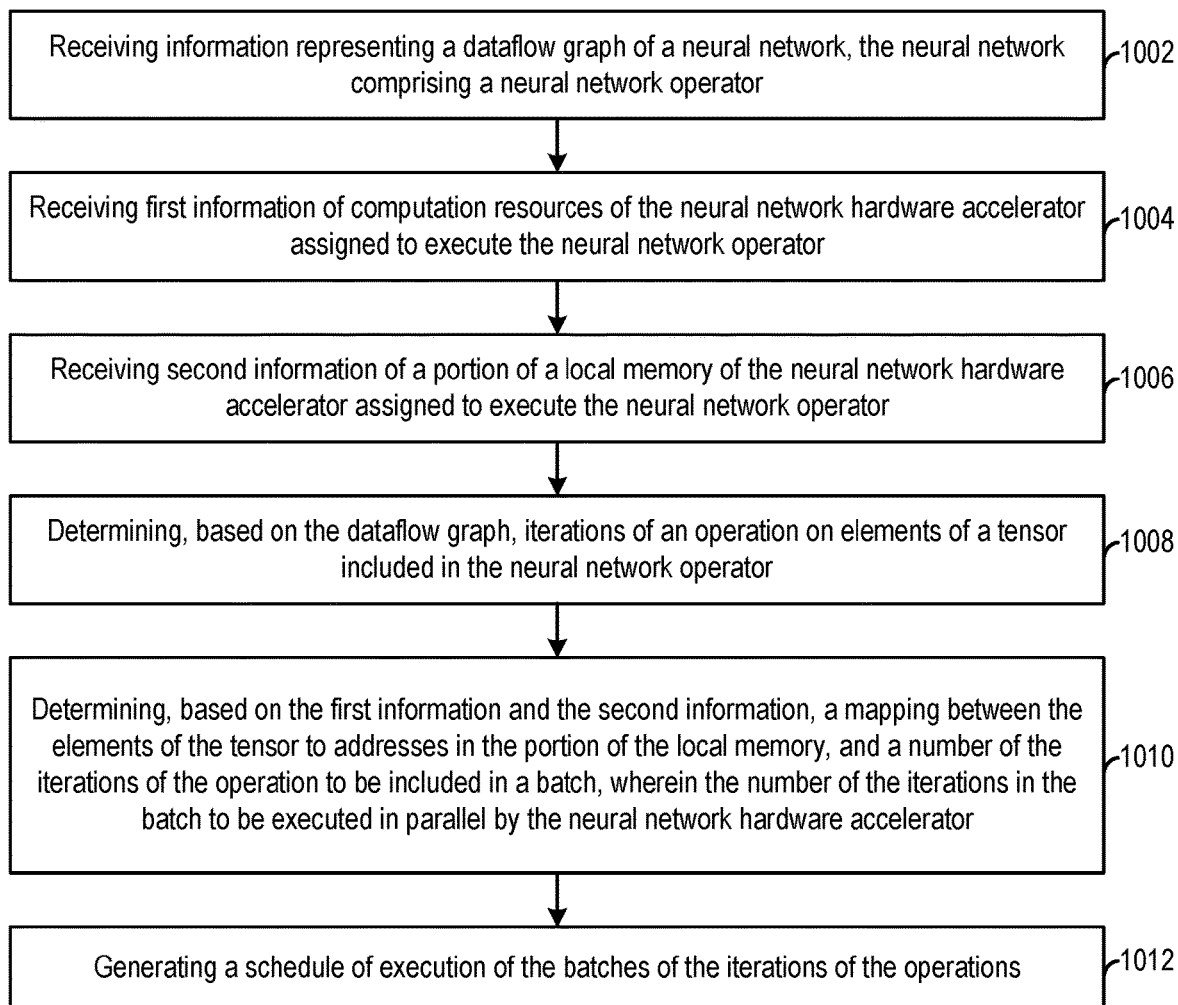
FIG. 10 includes a flowchart illustrating an example of a method of generating executable instructions associated with a neural network.

FIG. 10 illustrates a method 1000 of generating a schedule of execution of instructions for a neural network at a neural network hardware accelerator. Method 1000 can be performed by, for example, compiler 330 based on techniques described above.

Method 1000 start with step 1002, in which compiler 330 receives information representing a dataflow graph of a neural network, the neural network comprising a neural network operator. In some examples, compiler 330 can receive input codes involving neural network computations and compile the input codes to generate a dataset representing the dataflow graph of the neural network. An example of the dataflow graph is shown in FIG. 5B, which may include a plurality of neural network operators, such as an addition operator, a convolution operator, an activation function (e.g., ReLU) operator, etc. Each neural network operator can be represented as a node in the dataflow graph. The compiler can generate a linear graph from the dataflow graph by performing, for example, a topological sort as shown in FIG. 5B to assign each node (and the associated neural network operator) to the linear graph. The compiler can then generate a program representing the linear graph based on translating each neural network operator represented in the linear graph into a loop including instructions to access a tensor.

In step 1004, compiler 330 receives first information of computation resources of the neural network hardware accelerator assigned (or intended) to execute the neural network operator. Moreover, in step 1006, compiler 330 receives second information of a portion of a local memory of the neural network hardware accelerator assigned to execute the neural network operator. The first information may indicate, for example, a number of parallel execution of the neural network operator supported by the neural network hardware accelerator. The second information may indicate a size of the portion of the local memory, which can represent the memory space available to support the parallel execution.

In step 1006, compiler 330 determines, based on the dataflow graph, iterations of an operation on elements of a tensor included in the neural network operator. Specifically, each neural network operator represented in the linear graph into a loop includes instructions to access a tensor. In a case where the tensor is multi-dimensional and includes multiple tensors defined along different dimensions, the compiler can translate the neural network operator that accesses the multi-dimensional tensor into a loop-nest, with a parent outer-loop and one or more child inner-loops. The parent outer-loop and the child inner-loops can be associated with different induction variables associated with different dimensions. The loops can update the induction variables to select different tensors in different iterations. In some examples, the translation can be based on accessing loop-nest templates in a compute definition library that associates different loop-nest templates with different neural network operators. In some examples, additional processing, such as a loop fusion operation to fuse two or more loop-nests together while preserving the original behaviors of the loop-nests, can also be performed.

In step 1010, the compiler can determine, based on the first information and the second information, a mapping between the elements of the tensor to addresses in the portion of the local memory, and a number of the iterations of the operation to be included in a batch, wherein the number of the iterations in the batch to be executed in parallel by the neural network hardware accelerator.

Specifically, the mapping can be based on an array contraction operation, in which the compiler can identify one or more loops that index the tensor using the loop's induction variables, and determine an initial modulo operator for that loop as part of a global modulo allocation operation. The modulo operator can operate on the original indices (e.g., directly from the induction variables) of elements of the tensor in the program to generate remainder values. The remainder values can represent memory addresses. Through the modulo operation, elements of the tensor having different original indices can be mapped to a range of remainder values each representing a different address in the memory. The modulo operator can indicate how many elements of the tensor are mapped to different addresses in the memory. For example, for a modulo operator of m, m elements of the tensors are mapped to m different addresses, and m iterations of the loop can be included in a batch to be executed in parallel to access the m different addresses. Different groups of m elements are accessed in different batches, and the different groups are all mapped to the same set of m addresses. In a case of a multi-dimensional tensor including multiple tensors defined along multiple dimensions and associated with a loop-nest, and the compiler can determine an initial modulo operator for each loop that indexes the different tensors along different dimensions.

Prior to determining the mapping, compiler 330 can determine that the tensor has no loop-carried dependency using a two-part test described in FIG. 6C and FIG. 6D. The initial modulo operators for each loop can be determined based on a maximum degree of parallel execution of the neural network operator supported by the neural network hardware accelerator, as well as the size of memory space assigned to the neural network operator. In some examples, compiler 330 can determine the initial modulo operators of the tensors accessed by a loop-nest based on a topological order traversal, in which compiler 330 assigns the initial modulo operators of the tensors indexed by the parent loop first based on the assigned memory spaces for the tensors/elements indexed by the parent loop, as shown in FIG. 8B. Compiler 330 can then assign the initial modulo operators of the tensors indexed by the child loop, under the constraint that the product of the initial modulo operators across the loops remains equal to or below the maximum degree of parallel execution supported by the neural network hardware accelerator. In some examples, compiler 330 can also assign the initial modulo operators for the child loops first, followed by the parent loops. The order of assignment can be based on the architecture of the system to execute the neural network operator.

After determining the initial modulo operators, as part of the global modulo allocation operation, compiler 330 can reduce some or all of the initial modulo operators based on whether the total memory footprint by the tensors exceeds the available memory space. Specifically, referring to FIG. 8C-FIG. 8F, compiler 330 can determine the live interval of each tensor for which an initial modulo operator is assigned, as well as the size of memory used by the tensor during the live interval. Tensors having overlapping live intervals can indicate that the memory needs to store the tensors simultaneously, whereas tensors that do not have overlapping live intervals need not be stored simultaneously. Compiler 330 can determine the total memory footprint by the tensors based on identifying tensors having overlapping live intervals, as well as their memory footprints. If the total memory footprint of the tensors with the initial modulo operators is below the available memory space, the compiler can stop the global modulo allocation operation.

On the other hand, if the total memory footprint is above the available memory space, the compiler can determine an overflowing tensor that cannot fit into the available memory space. Referring to FIG. 8C-FIG. 8F, to reduce the total memory footprint, the compiler identifies the loop that includes a first write instruction and a last read instruction of that tensor, and reduces the initial modulo operator of the closest parent loop of the loop in the hierarchy (e.g., by reducing it by half) if the initial modulo operator of the closest parent loop is bigger than one. Such arrangements can be more effective in reducing the total memory footprint, since reducing the initial modulo operator of the parent loop can reduce the memory footprint both by the parent tensor indexed by the parent loop and by the child tensor (the overflowing tensor) indexed by the second parent loop. The reduction of the memory footprint by the first tensor can be due to mapping the elements of the first tensor to fewer addresses. Moreover, the reduction of the memory footprint by the second tensor can be due to reducing the number of parallel iterations of the child loop (given by the product of the modulo operators of both loops), which can also reduce the number of addresses mapped to the elements of the second tensor.

In some examples, referring to FIG. 9A-FIG. 9C, the neural network operator can also include one or more DMA tensors accessed by DMA instructions to transfer data between an external memory and the local memory of the neural network hardware accelerator. As part of the global modulo allocation operation, the compiler can also determine the modulo operator that maps the elements of the DMA tensor to the addresses of the local memory. In some examples, the modulo operator of the DMA tensors may be larger than the modulo operator of other tensors, to improve the parallel execution of the DMA instructions due to memory bottleneck.

In step 1012, compiler 330 generates a schedule of execution of the batches of the iterations of the operations. Compiler 330 can determine a schedule of execution of the different iterations of the loops in the program and the mapping of the tensors to the memory addresses based on the modulo operators. The compiler can perform the scheduling based on estimating the total completion time of the DMA operations, which can include the memory access delay as well as memory data transfer delay over the interconnect, as well as data dependency between the tensors. The compiler can then generate executable instructions that reflect the schedule of execution of the different iterations of the loops in the program, based on techniques shown i FIG. 6B and FIG. 7A.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules. Any of the methods described herein can be implemented as a computer-readable medium or computer program product comprising instructions which, when the program is executed by one or more computers, cause the one or more computers to carry out the steps of the method. Such computer program products can be transmitted, over a wired or wireless network, in a data carrier signal carrying the computer program product.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

What is claimed is:

1. A method of accelerating an execution of loops in a neural network at a neural network hardware accelerator, the method being performed by a compiler and comprising:
receiving input codes of a neural network, the neural network comprising a neural network operator;
receiving first information of a first quantity of computation resources of the neural network hardware accelerator assigned to execute the neural network operator;
receiving second information of a second quantity of memory resources of the neural network hardware accelerator assigned to execute the neural network operator;
compiling the input codes to generate an input data set representing a dataflow graph of the neural network;
generating, based on the input data set, a loop-nest representation of the neural network, the loop-nest including a parent loop and a child loop nested within the parent loop, elements of a first tensor being associated with first indices determined by a first induction variable of the parent loop, and elements of a second tensor being associated with second indices determined by a second induction variable of the child loop;
determining, based on the first information and the second information, a first modulo operator to map the first indices to first remainders and a second modulo operator to map the second indices to second remainders;
determining, based on the first modulo operator and the second modulo operator, a first number of iterations of the loop-nest to be included in a batch to access the first tensor and the second tensor, wherein the first number of iterations in the batch are to be executed in parallel by the neural network hardware accelerator;
determining a schedule of execution of the batches of iterations of the loop-nest; and
generating executable instructions to be executed by the neural network hardware accelerator based on the schedule of execution.

2. The method of claim 1, wherein:
the memory resources are provided by a local memory of the neural network hardware accelerator;
the first modulo operator maps elements of the first tensor to a first number of memory addresses in the local memory represented by the first remainders;
the second modulo operator maps elements of the second tensor to a second number of memory addresses in the local memory represented by the second remainders; and
a sum of the first number and the second number is equal to or below the first quantity.

3. The method of claim 1, wherein:
the first information indicates that the computation resources comprise a second number of computation engines, each computation engine to execute an iteration of the loop-nest;
a product of the first modulo operator and the second modulo operator is equal to the first number; and
the first number is less than or equal to the second number.

4. The method of claim 1, wherein:
the first tensor and the second tensor are part of a multi-dimensional tensor;
the first indices are associated with a first dimension;
the second indices are associated with a second dimension;
a product of the first modulo operator and the second modulo operator equals a second number of memory addresses mapped to elements of the multi-dimensional tensor; and
each iteration of the loop-nest includes an instruction to access an element of the multi-dimensional tensor at the mapped memory address.

5. The method of claim 1, wherein:
the input codes include a direct memory access (DMA) instruction to access a third tensor in the child loop, elements of the third tensor being associated with the second indices; and
the method further comprises determining a third modulo operator to map the second indices of the third tensor to third remainders, the third remainders being different from the second remainders, such that a larger number of iterations of the DMA instruction to access the third tensor is included in the batch than iterations of an instruction to access the first tensor or the second tensor.

6. A method, the method being performed by a compiler and comprising:
receiving a dataflow graph of a neural network, the neural network comprising a neural network operator;
receiving first information of computation resources of a neural network hardware accelerator intended to execute the neural network operator;
receiving second information of a portion of a local memory of the neural network hardware accelerator intended to execute the neural network operator;
determining, based on the dataflow graph, iterations of an operation on elements of a tensor included in the neural network operator;
determining, based on the first information and the second information, a mapping between the elements of the tensor to addresses in the portion of the local memory, and a number of the iterations of the operation to be included in a batch, wherein the number of the iterations in the batch are to be executed in parallel by the neural network hardware accelerator;
generating one or more loop representations of the iterations of the operation, the loop representations including:
one or more loops that increments one or more induction variables; and
an instruction in a body of the loop to perform the operation on an element of the tensor, the element being associated with an index determined by the one or more induction variables;

generating a schedule of execution of the batches of the iterations of the operations; and generating executable instructions to be executed by the neural network hardware accelerator based on the schedule of execution.

7. The method of claim 6, further comprising:
adding a modulo operator to at least one of the one or more induction variables of the index of the element of the tensor in the loop representation.

8. The method of claim 7, wherein the modulo operator maps indices of the elements of the tensor to remainders representing a set of memory addresses in the portion of the local memory;
wherein a value of the modulo operator indicates a number of iterations of the loop to be executed in parallel in the neural network hardware accelerator; and
wherein the value of the modulo operator is determined based on the first information and the second information.

9. The method of claim 8, further comprising:
determining, based on the modulo operator, a first batch and a second batch of the iterations of the loop to be executed in parallel; and
determining a schedule of execution indicating that the first batch is to be executed at a first time and the second batch is to be executed at a second time after the first time.

10. The method of claim 9, wherein:
the tensor is a first tensor;
the index is a first index;
the operation is a first operation;
the instruction is a first instruction;
the set of memory addresses is a first set of memory addresses;
the neural network operator further comprises iterations of a second operation on a second tensor;
the modulo operator is a first modulo operator;
the method further includes:
generating the loop representation to include a second instruction in the body of the loop to perform the second operation on an element of the second tensor, the element of the second tensor being associated with a second index; and
adding a second modulo operator to the index of the element of the second tensor in the loop representation to map elements of the second tensor to a second set of memory addresses in the portion of the local memory.

11. The method of claim 10, wherein the second operation generates the second tensor based on the first tensor;
wherein each of the first batch and the second batch includes iterations of the first operation to be executed in parallel and iterations of the second operation to be executed in parallel; and
wherein the schedule of execution indicates that iterations of the second operation are to be executed in parallel after the parallel execution of the iterations of the first operation completes.

12. The method of claim 10, wherein the first modulo operator is different from the second modulo operator.

13. The method of claim 12, wherein the first operation includes a direct memory access (DMA) operation; and
wherein each of the first batch and the second batch includes a first number of iterations of the DMA operation to be executed in parallel and a second number of iterations of the second operation to be executed in parallel, the first number being larger than the second number.

14. The method of claim 13, wherein the schedule of execution indicates:
start the parallel execution of the first number of iterations of the DMA operation at a first time;
start the parallel execution of a first group of the second number of iterations of the second operation at a second time, after a first subset of the first number of iterations of the DMA operation completes; and
start the parallel execution of a second group of the second number of iterations of the second operation at a third time, after a second subset of the second number of iterations of the DMA operation completes.

15. The method of claim 10, wherein:
the loop representation includes a loop-nest;
the induction variable is a first induction variable;
the loop-nest includes a parent loop and a child loop nested within the parent loop, the loop being the parent loop;
the indices include first, indices and second indices;
the first indices are determined by the first induction variable of the parent loop;
the second indices are determined by a second induction variable of the child loop; and
a product of the first modulo operator and the second modulo operator is determined based on the first information and the second information.

16. The method of claim 15, further comprising:
determining that the tensor has no loop-carried dependency across loops between iterations of a loop; and
adding the modulo operator to the index of the element of the tensor in the loop representation based on the determination of no loop-carried dependency.

17. The method of claim 15, further comprising:
assigning a first initial modulo operator to the first indices of the first tensor;
assigning a second initial modulo operator to the second indices of the second tensor;
determining, based on the second information, that the second tensor having the second initial modulo operator causes a total memory footprint of the first tensor and the second tensor exceeds a total size of the portion of the local memory;
determining that the second operation included in the child loop contains a first write instruction and a last read instruction of an element of the second tensor;
determining that the parent loop is a closest ancestor loop of the child loop; and
reducing the first initial modulo operator.

18. The method of claim 6, further comprising:
performing a topology sort on the dataflow graph to generate a linear graph;
translating, based on accessing loop templates in a compute definition library, each neural network operator in the linear graph into a loop representation; and
generating a program of the loop representations following an order of the corresponding neural network operators in the linear graph; and
wherein the schedule of execution and the executable codes are determined based on the program.

19. A non-transitory computer-readable medium having stored therein instructions that, when executed by one or more processors, cause the one or more processors to execute a compiler, the compiler performing operations including:

receiving a dataflow graph of a neural network, the neural network comprising a neural network operator;

receiving first information of computation resources of a neural network hardware accelerator intended to execute the neural network operator;

receiving second information of a portion of a local memory of the neural network hardware accelerator intended to execute the neural network operator;

determining, based on the dataflow graph, iterations of an operation on elements of a tensor included in the neural network operator;

determining, based on the first information and the second information, a mapping between the elements of the tensor to addresses in the portion of the local memory, and a number of the iterations of the operation to be included in a batch, the number of the iterations in the batch to be executed in parallel by the neural network hardware accelerator;

generating one or more loop representations of the iterations of the operations the loop representations including:

one or more loops that increments one or more induction variables; and an instruction in a body of the loop to perform the operation on an element of the tensor, the element being associated with an index determined by the one or more induction variables;

generating a schedule of execution of the batches of the iterations of the operations; and generating executable instructions to be executed by the neural network hardware accelerator based on the schedule of execution.

* * * * *